United States Patent
Adiletta et al.

(10) Patent No.: US 10,356,495 B2
(45) Date of Patent: Jul. 16, 2019

(54) TECHNOLOGIES FOR COOLING RACK MOUNTED SLEDS

(71) Applicant: Intel Corporation, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,653

(22) Filed: Dec. 31, 2016

(65) Prior Publication Data
US 2018/0027703 A1    Jan. 25, 2018

Related U.S. Application Data

(60) Provisional application No. 62/365,969, filed on Jul. 22, 2016, provisional application No. 62/376,859, (Continued)

(51) Int. Cl.
*H05K 7/20* (2006.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01);
(Continued)

(58) Field of Classification Search
None
See application file for complete search history.

(56) References Cited

U.S. PATENT DOCUMENTS 5,579,204 A * 11/1996 Nelson ................. G11B 33/126
                                                              361/679.32
6,833,995 B1 * 12/2004 Hsue ......................... G06F 1/20
                                                              211/184
(Continued)

*Primary Examiner* — Bernard G Lindsay
(74) *Attorney, Agent, or Firm* — Barnes & Thornburg LLP

(57) ABSTRACT

Technologies for rack cooling includes monitoring a temperature of a sled mounted in a rack and controlling a cooling system of the rack based on the temperature of the sled. The cooling system includes a cooling fan array, which may be controlled to cool the sled. Additionally, if needed, one or more adjacent cooling fan arrays that are located adjacent to the controlled cooling fan array may be adjusted to provide additional cooling to the sled.

10 Claims, 20 Drawing Sheets

Related U.S. Application Data filed on Aug. 18, 2016, provisional application No. 62/427,268, filed on Nov. 29, 2016.

(51) Int. Cl.

| | |
|---|---|
| H03M 7/40 | (2006.01) |
| H03M 7/30 | (2006.01) |
| G06F 16/901 | (2019.01) |
| G06F 3/06 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.

CPC .......... *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 69/04* (2013.01); *H04L 69/329* (2013.01); *H04Q 1/04* (2013.01); *H04Q 11/00* (2013.01); *H04Q 11/0003*

(2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

| | | | |
|---|---|---|---|
| 9,642,286 B1 * | 5/2017 | Gutierrez | H05K 7/20754 |
| 2012/0203393 A1 * | 8/2012 | Dumitru | G06F 1/206 |
| | | | 700/300 |
| 2012/0281368 A1 * | 11/2012 | Nicol | H05K 9/0054 |
| | | | 361/736 |

* cited by examiner

TECHNOLOGIES FOR COOLING RACK MOUNTED SLEDS

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Typical enterprise-level data centers can include several to hundreds of racks or cabinets, with each rack/cabinet housing multiple servers. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional servers of a data center are self-contained compute devices designed to be mounted into a corresponding rack of the data center. To do so, typical data center servers include a housing with corresponding mounting mechanisms, such as brackets, to facilitate the mounting of the server into the rack or cabinet. The electrical components of the server are located within the housing, and the housing provides an amount of protection to the electrical components from the local environment. Additionally, typical servers often include their own peripheral components or systems, such as an internal power supply and internal cooling.

Traditional rack systems are self-contained physical support structures that include a number of pre-defined server spaces. A server may be mounted in each pre-defined server space. Typical rack systems often include an enclosure or housing in which the pre-defined server spaces are located.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
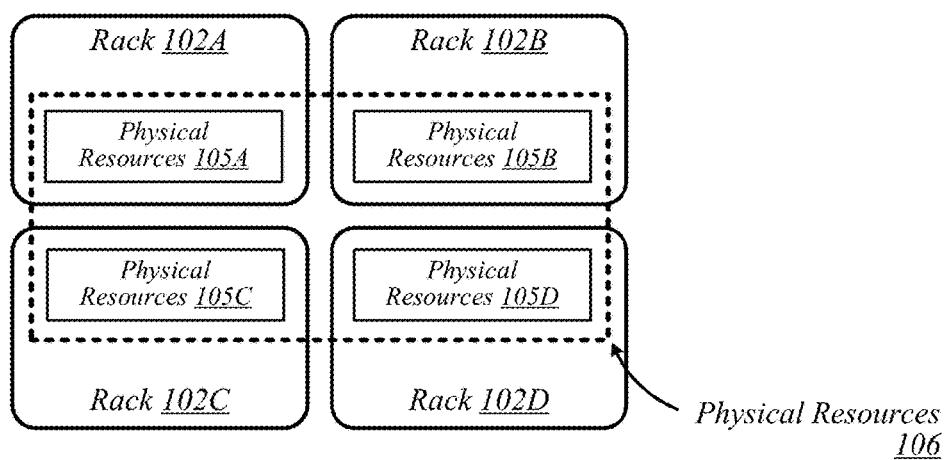
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
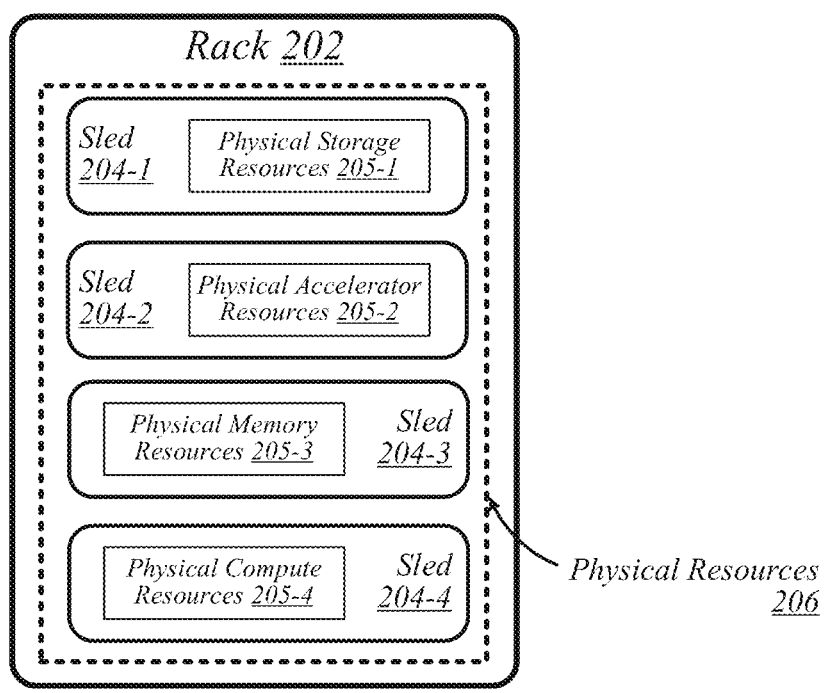
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
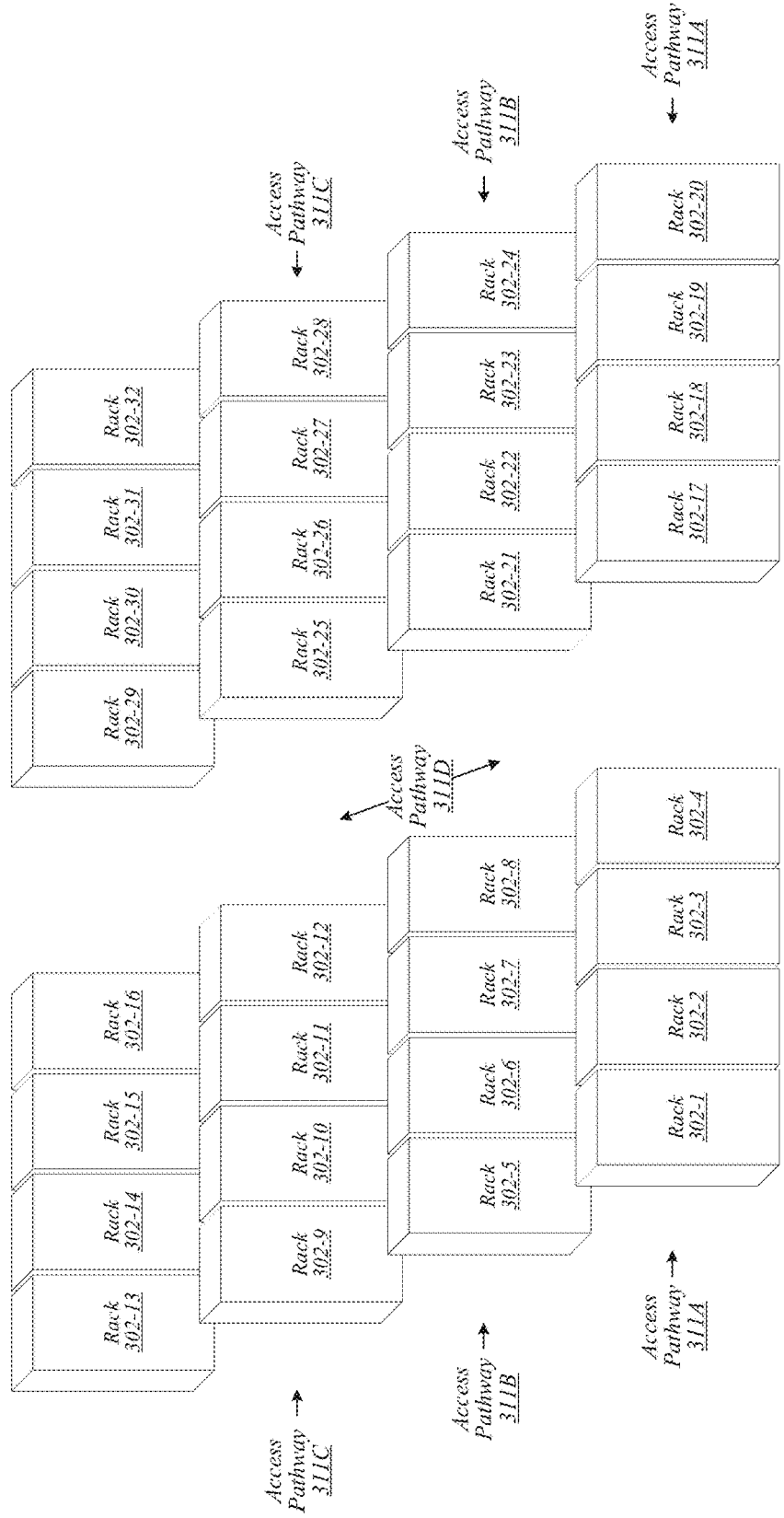
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
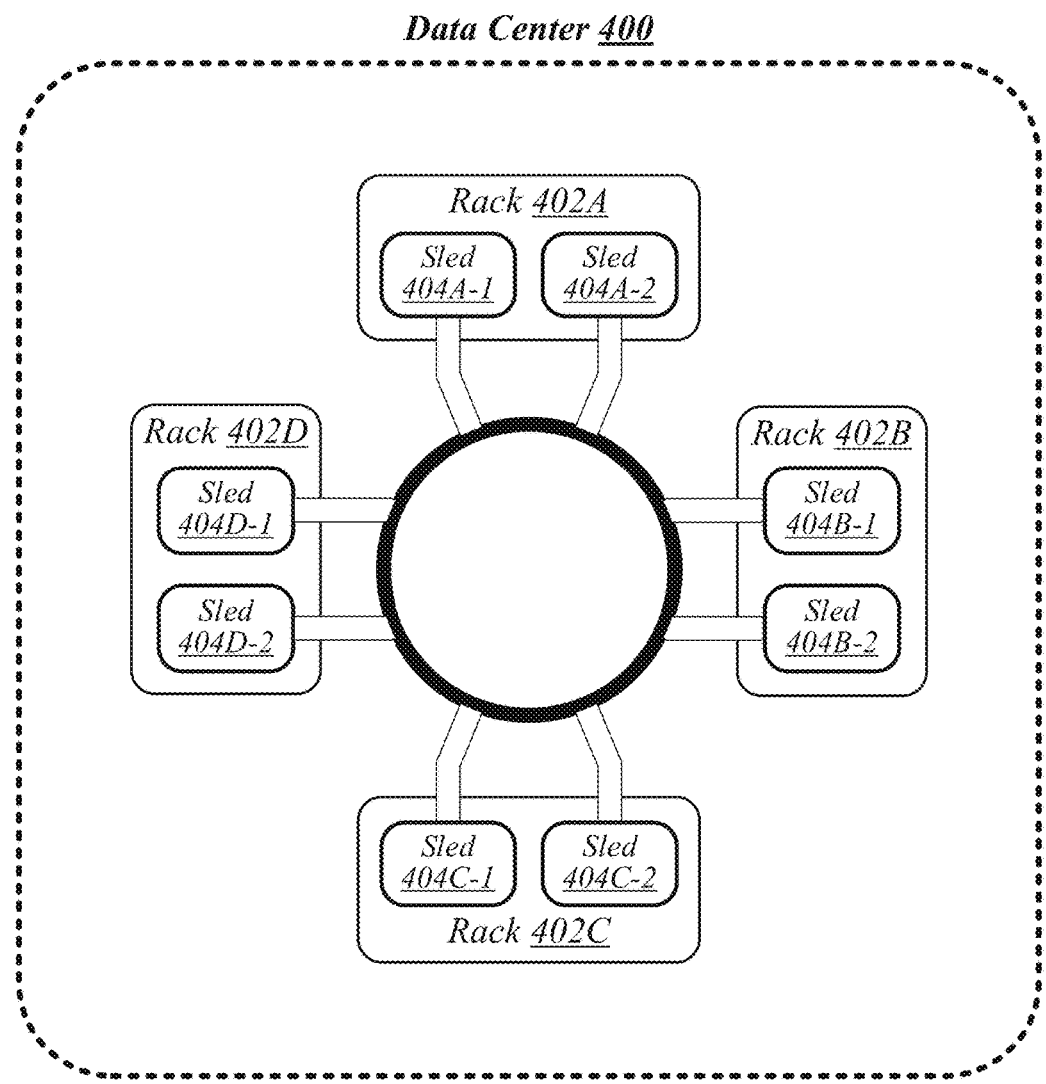
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
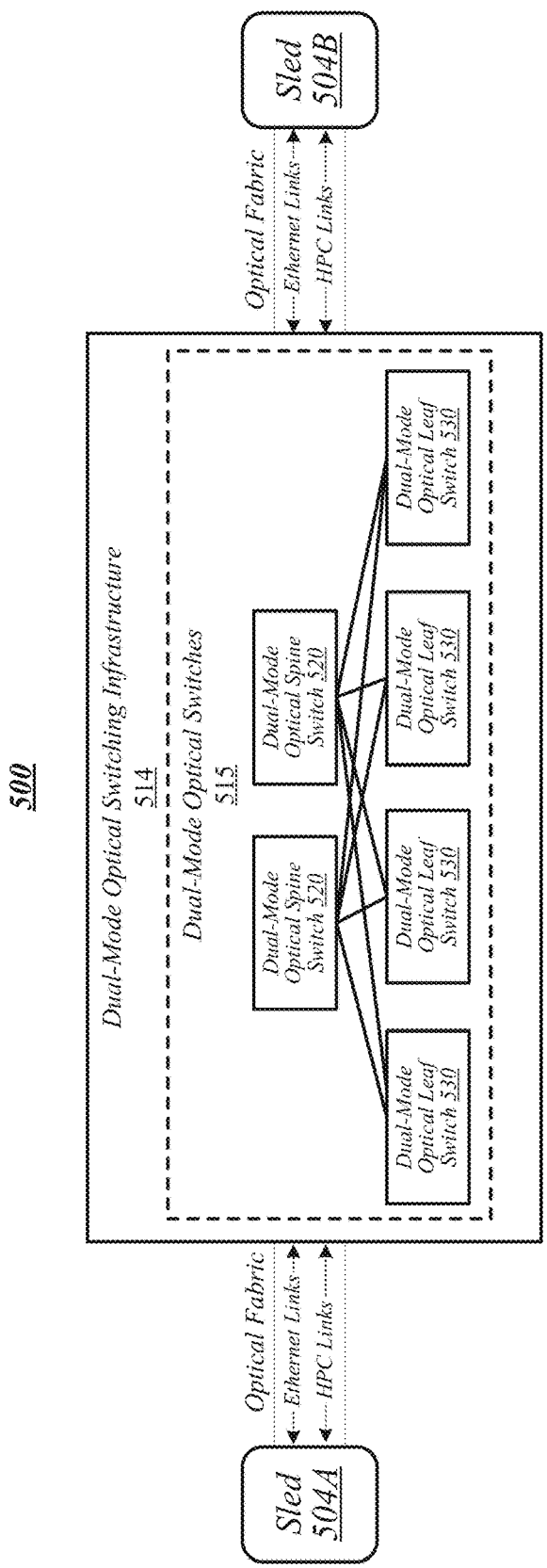
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
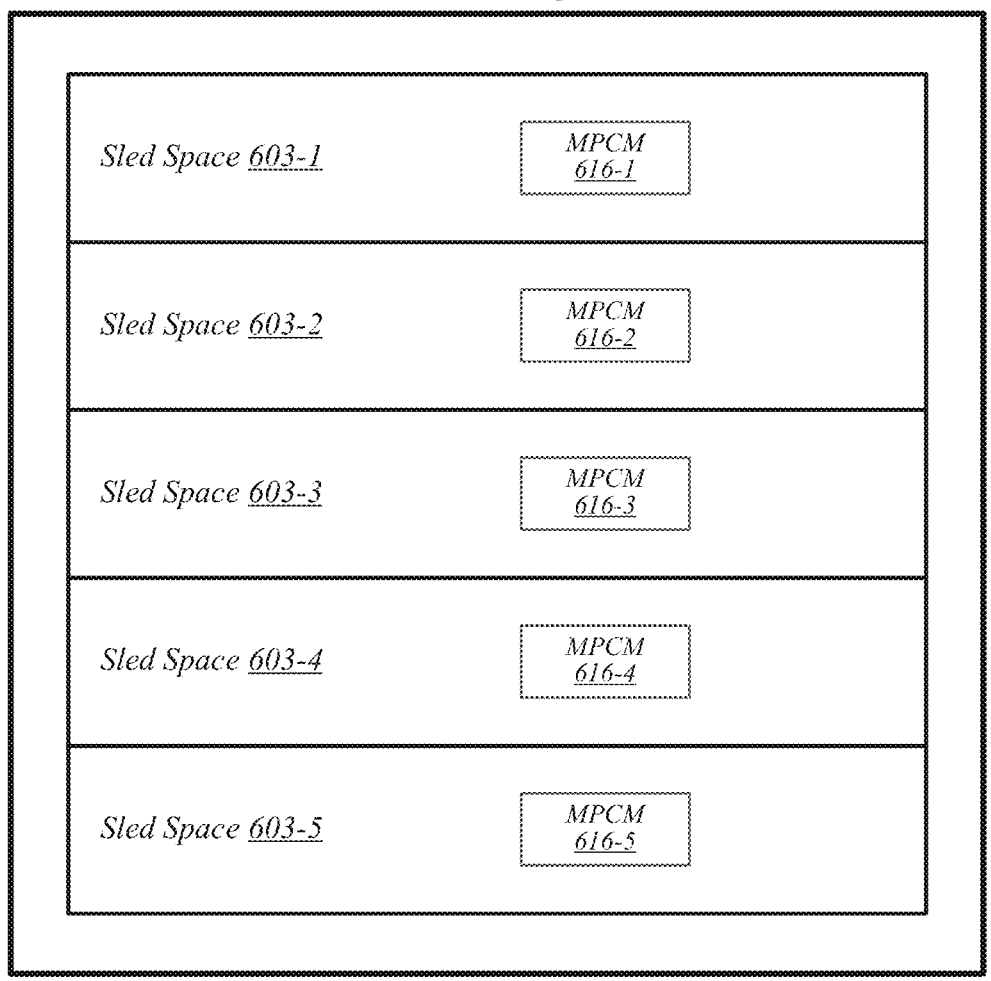
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
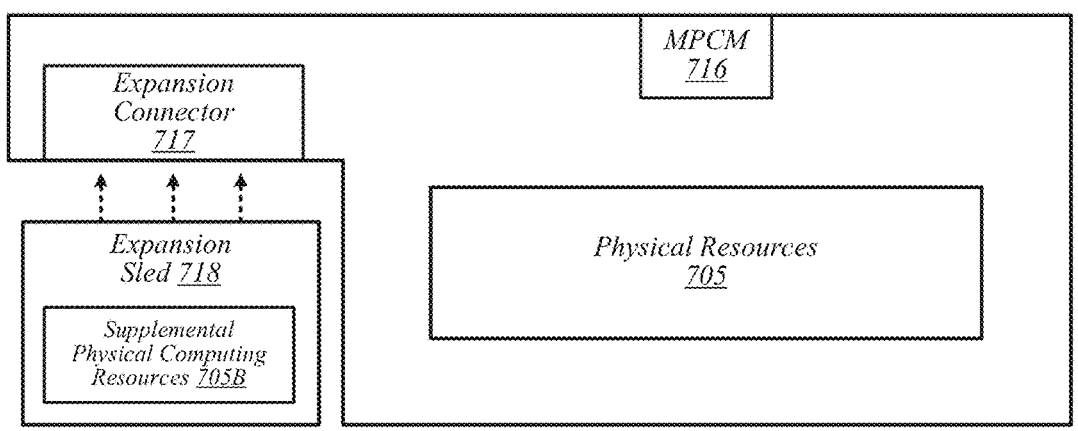
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
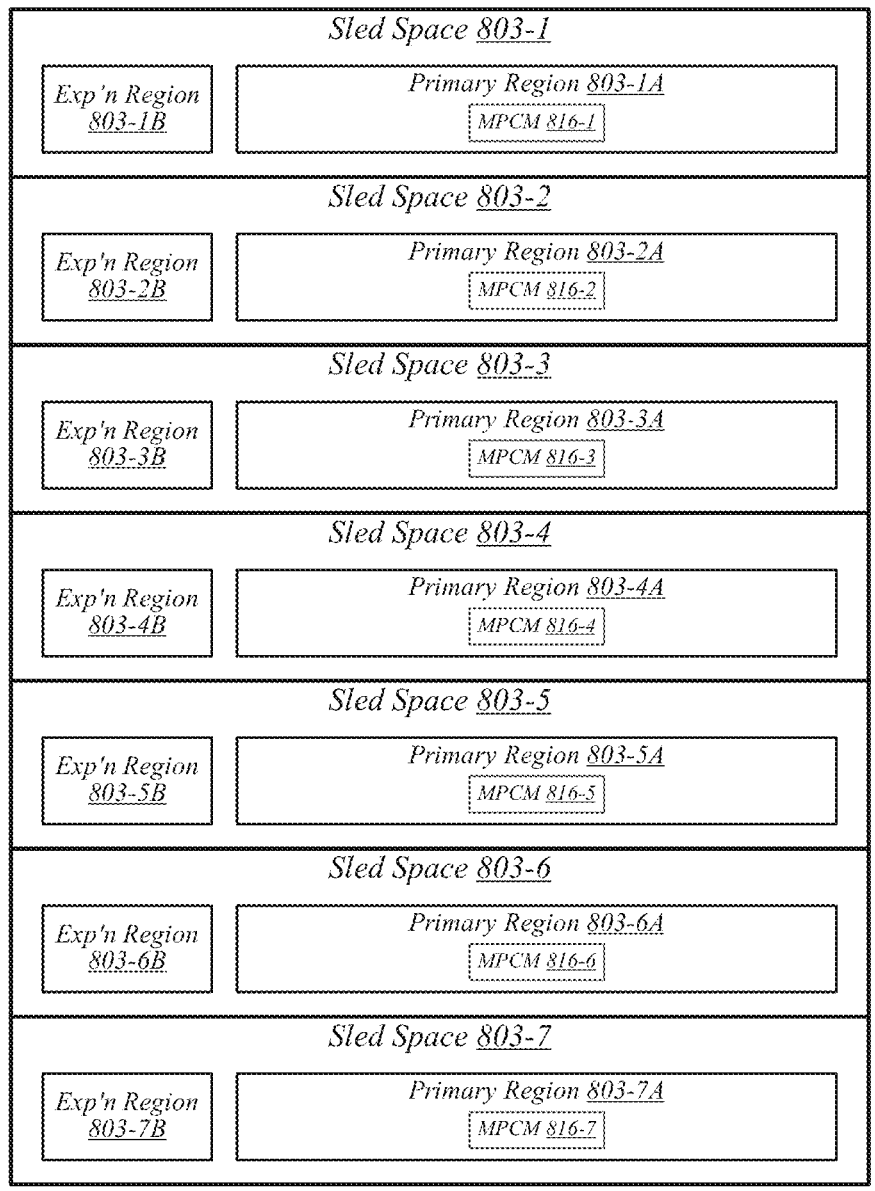
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
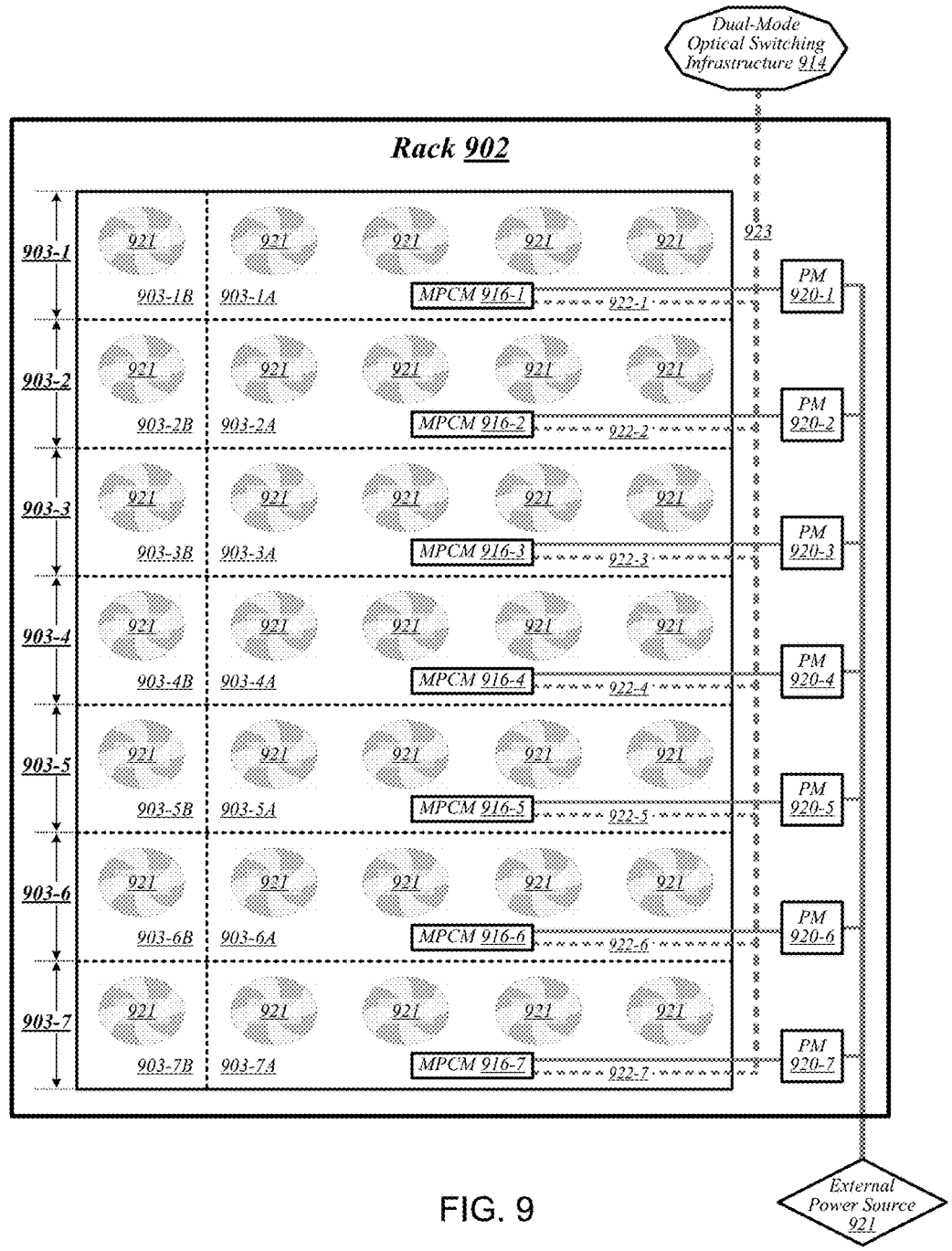
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heatsinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
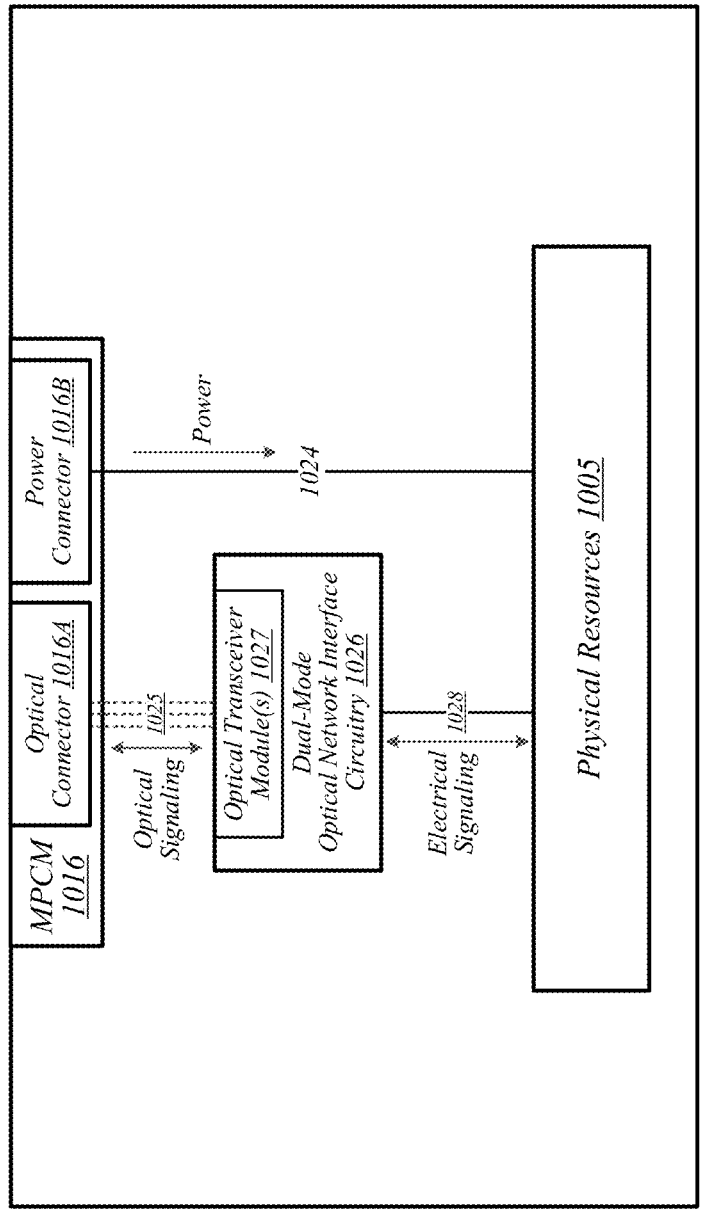
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heatsinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
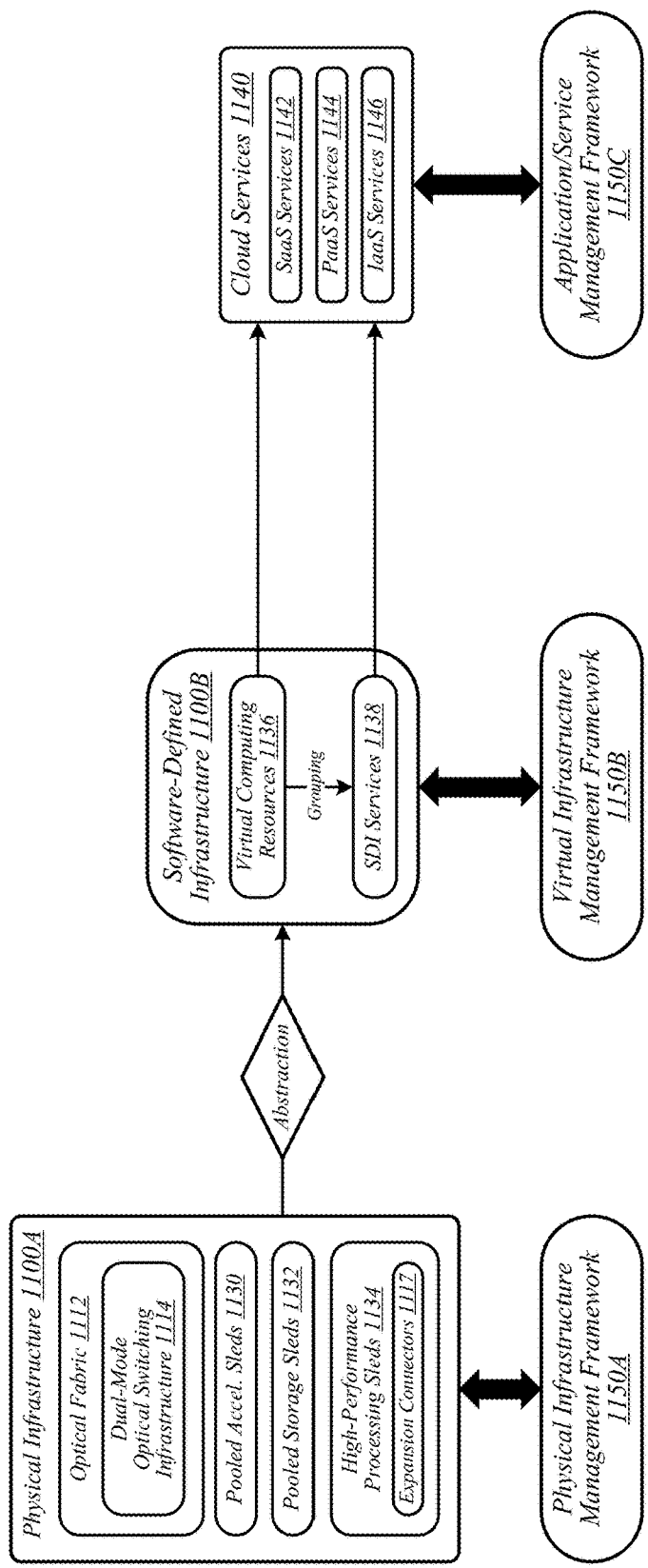
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
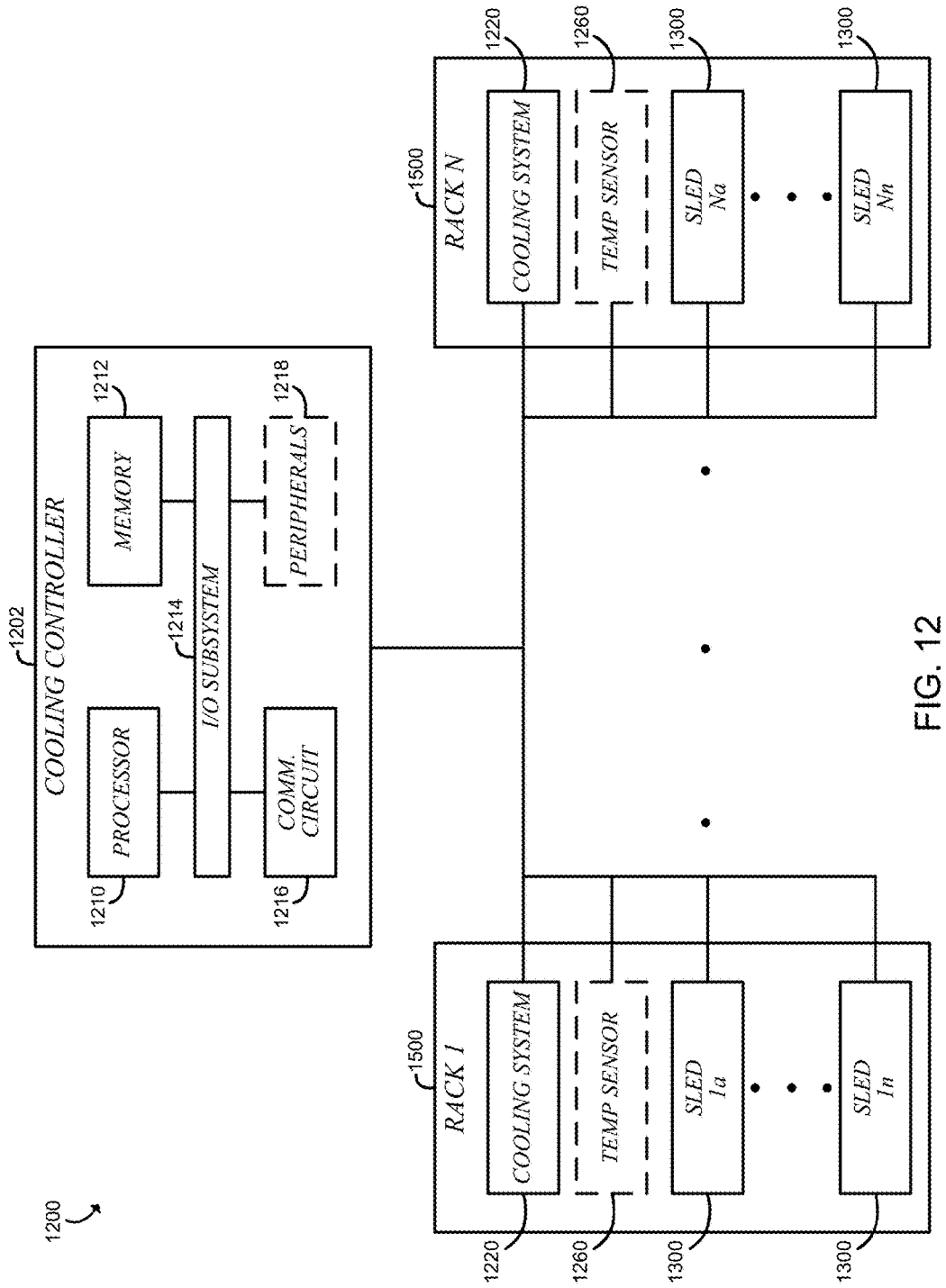
FIG. 12 is a simplified block diagram of at least one embodiment of a data center including a cooling controller and several racks.

Referring now to FIG. 12, each of the data centers 100, 300, 400, 1100 may be embodied as, or otherwise include, a data center 1200 in some embodiments. The data center 1200 includes a cooling controller 1202 and one or more racks 1500. Each rack 1500 includes a cooling system 1220 and one or more sleds 1300 mounted therein. Additionally, in some embodiments, each rack 1500 may include one or more temperature sensors 1260. The temperature sensors 1260 may be embodied as any type of sensor capable of producing sensor data indicative of a temperature of one or more sever sleds 1300 mounted in the corresponding rack 1500. Although each rack 1500 includes only a single temperature sensor 1260 in FIG. 12, it should be appreciated that each rack 1500 may include multiple temperature sensors 1260 in other embodiments. For example, each rack 1500 may include a temperature sensor 1260 for each sled 1300 or sled slot of the rack 1500 configured to receive a sled 1300.

In use, the cooling controller 1202 is configured to monitor a temperature of each sled 1300 of the data center 1200 and control the cooling systems 1220 of the racks 1500 based on the determined temperature of the sleds 1300. To do so, the cooling controller 1202 may monitor sensor data produced by a temperature sensor 1360 (see FIG. 13) of each sled 1300 and/or the temperature sensor 1260 of each rack 1500 in those embodiments in which the rack 1500 includes the temperature sensor 1260. As discussed in more detail below, the cooling system 1220 of each rack 1500 is embodied as fan arrays configured to cool corresponding sleds 1300. As such, the cooling controller 1202 may control a speed of the various fans of the fan array to control the temperature of the corresponding sled 1300 based on the sensed or determined temperature of that particular sled 1300. However, due to the open-aired nature of both the sleds 1300 and the racks 1500, as discussed in more detail below, the cooling controller 1202 may also augment the cooling of a particular sled 1300, as needed, by controlling other fan arrays adjacent to the fan array presently cooling the particular sled 1300. For example, the cooling controller 1202 may increase the fan speed of an adjacent fan array to provide additional cooling to the particular sled 1300. In this way, the cooling controller 1202 may compensate for "hot" sleds 1300 by utilizing fan arrays of cooler sleds 1300.

It should be appreciated that the data center 1200 illustrated in FIG. 12 is non-limiting and that the data center 1200 may include additional devices and/or components not illustrated in FIG. 12 for clarity of the description. For example, the data center 1200 may include various data center managers, orchestrators, and/or other management servers or compute devices. Additionally, the data center 1200 may include various devices to facilitate intra-data center communications such as switches or routers.

The cooling controller 1202 may be embodied as any type of controller, server, or other compute device capable of controlling the cooling system 1220 of the individual racks 1500. In the illustrative embodiment, the cooling controller 1202 includes processor 1210, a memory 1212, an input/output (I/O) subsystem 1214, and a communication circuit 1216. In some embodiments, one or more of the illustrative components of the cooling controller 1202 may be incorporated in, or otherwise form a portion of, another component. For example, the memory 1212, or portions thereof, may be incorporated in the processor 1210 in some embodiments.

The processor 1210 may be embodied as any type of processor capable of performing the functions described herein. For example, the processor 1210 may be embodied as a single or multi-core processor(s), a single or multi-socket processor, a digital signal processor, a graphics processor, a microcontroller, or other processor or processing/controlling circuit. Similarly, the memory 1212 may be embodied as any type of volatile or non-volatile memory or data storage capable of performing the functions described herein. In operation, the memory 1212 may store various data and software used during operation of the cooling controller 1202 such as operating systems, applications, programs, libraries, and drivers. The memory 1212 is communicatively coupled to the processor 1210 via the I/O subsystem 1214, which may be embodied as circuitry and/or components to facilitate input/output operations with the processor 1210, the memory 1212, and other components of the cooling controller 1202. For example, the I/O subsystem 1214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1214 may form a portion of a system-on-a-chip (SoC) and be incorporated, along with the processor 1210, the memory 1212, and other components of the cooling controller 1202 on a single integrated circuit chip.

The communication circuit 1216 may be embodied as any type of communication circuit, device, or collection thereof, capable of enabling communications between the cooling controller 1202 and the sleds 1300 and racks 1500. To do so, the communication circuit 1216 may be configured to use any one or more communication technology and associated protocols (e.g., Ethernet, Bluetooth®, Wi-Fi®, WiMAX, near field communication (NFC), etc.) to effect such communication.

In some embodiments, the cooling controller 1202 may include one or more peripheral devices 1218, such as those commonly found in a compute device. For example, the peripheral devices 1218 may include a keyboard, a mouse, a display, etc.

Figure 13:
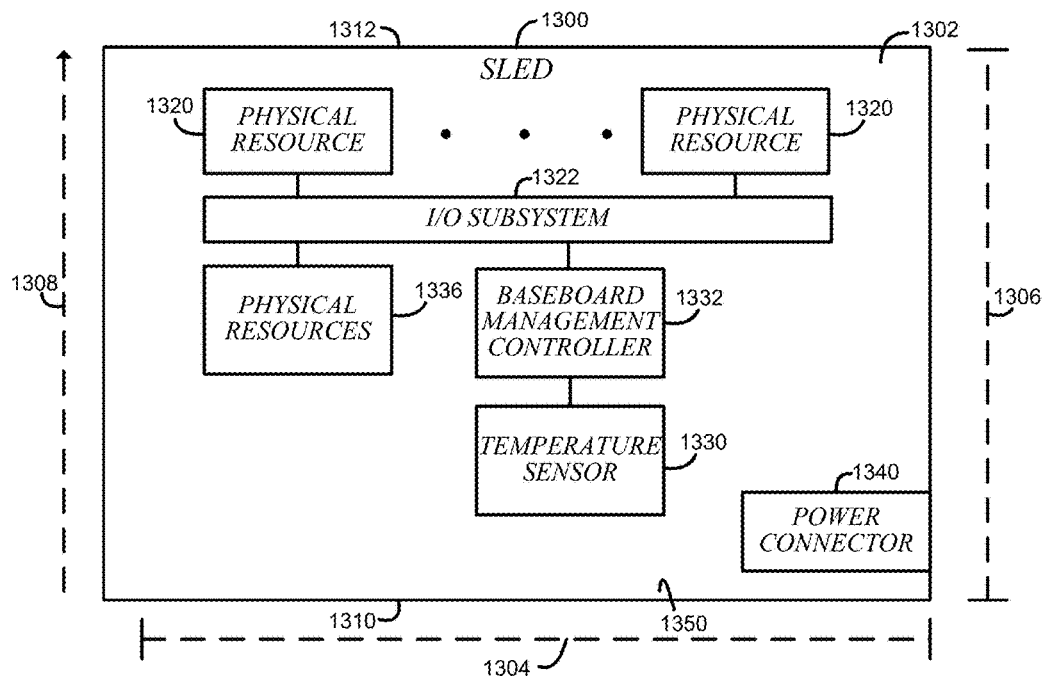
FIG. 13 is a simplified block diagram of at least one embodiment of a top side of a sled usable in a rack of the data center of FIG. 12.
Figure 14:
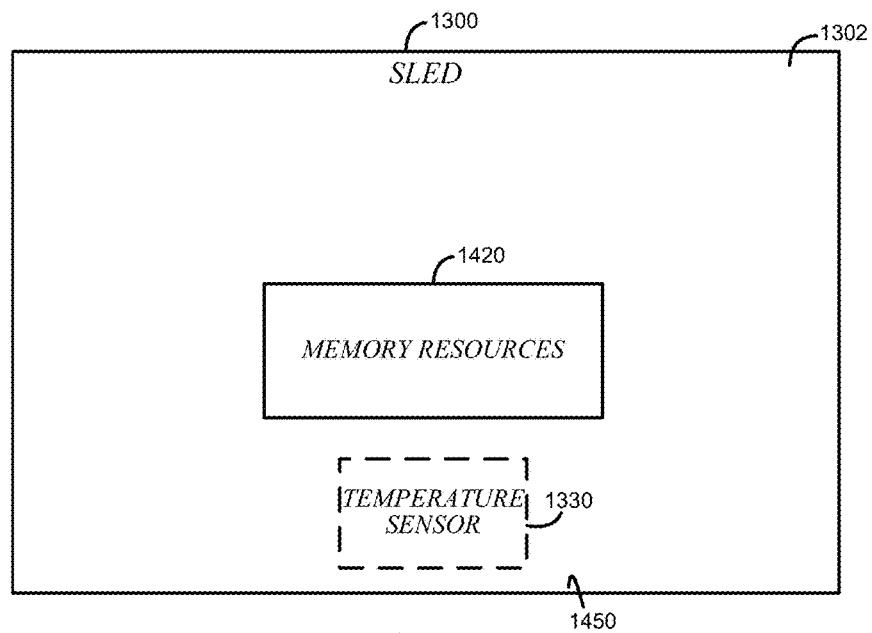
FIG. 14 is a simplified block diagram of at least one embodiment of a bottom side of the sled of FIG. 13.

Referring now to FIGS. 13 and 14, each of the sleds 204, 404, 504, 704, 1004 may be embodied as a sled 1300 in some embodiments. As discussed below, the sled 1300 is configured to be mounted in a corresponding rack 1500 (see FIGS. 14-20) of the data center 1200. In some embodiments, the sled 1300 may be optimized or otherwise configured for performing particular tasks, such as compute tasks, acceleration tasks, data storage tasks, etc.

The illustrative sled 1300 includes a chassis-less circuit board substrate 1302, which supports various electrical components mounted thereon. It should be appreciated that the circuit board substrate 1302 is "chassis-less" in that the sled 1300 does not include a housing or enclosure. Rather, the chassis-less circuit board substrate 1302 is open to the local environment. The chassis-less circuit board substrate 1302 may be formed from any material capable of supporting the various electrical components mounted thereon. For example, in an illustrative embodiment, the chassis-less circuit board substrate 1302 is formed from an FR-4 glass-reinforced epoxy laminate material. Of course, other materials may be used to form the chassis-less circuit board substrate 1302 in other embodiments.

The chassis-less circuit board substrate 1302 includes multiple features that improve the thermal cooling characteristics of the various electrical components mounted on the chassis-less circuit board substrate 1302. As discussed, the chassis-less circuit board substrate 1302 does not include a housing or enclosure, which may improve the airflow over the electrical components of the sled 1300 by reducing those structures that may inhibit air flow. For example, because the chassis-less circuit board substrate 1302 is not positioned in an individual housing or enclosure, there is no backplane (e.g., a backplate of the chassis) to the chassis-less circuit board substrate 1302, which could inhibit air flow across the electrical components. Additionally, the chassis-less circuit board substrate 1302 has a geometric shape configured to reduce the length of the airflow path across the electrical components mounted to the chassis-less circuit board substrate 1302. For example, the illustrative chassis-less circuit board substrate 1302 has a width 1304 that is greater than a depth 1306 of the chassis-less circuit board substrate 1302. In one particular embodiment, for example, the chassis-less circuit board substrate 1302 has a width of about 21 inches and a depth of about 9 inches, compared to a typical server that has a width of about 17 inches and a depth of about 30 inches. As such, an airflow path 1308 that extends from a front edge 1310 of the chassis-less circuit board substrate 1302 toward a rear edge 1312 has a shorter distance relative to typical servers, which may improve the thermal cooling characteristics of the sled 1300. Furthermore, although not illustrated in FIG. 13, the various electrical components mounted to the chassis-less circuit board substrate 1302 are mounted in corresponding locations such that no two substantively heat-producing electrical components shadow each other as discussed in more detail below. That is, no two electrical components, which produce appreciable heat during operation (i.e., greater than nominal heat), are mounted to the chassis-less circuit board substrate 1302 linearly in-line with each other along the direction of the airflow path 1308 (i.e., along a direction extending from the front edge 1310 toward the rear edge 1312 of the chassis-less circuit board substrate 1302).

The illustrative sled 1300 includes one or more physical resources 1320 mounted to a top side 1350 of the chassis-less circuit board substrate 1302. Of course, in other embodiments, one or more of the physical resource 1320 may be mounted to the bottom side 1450 of the chassis-less circuit board substrate 1302. Additionally, although two physical resources 1320 are shown in FIG. 13, it should be appreciated that the sled 1300 may include one, two, or more physical resources 1320 in other embodiments. The physical resources 1320 may be embodied as any type of processor, controller, or other compute circuit capable of performing various tasks such as compute functions and/or controlling the functions of the sled 1300 depending on, for example, the type or intended functionality of the sled 1300. For example, as discussed in more detail below, the physical resources 1320 may be embodied as high-power processors in embodiments in which the sled 1300 is embodied as a compute sled, as accelerator co-processors or circuits in embodiments in which the sled 1300 is embodied as an accelerator sled, and/or storage controllers in embodiments in which the sled 1300 is embodied as a storage sled.

The sled 1300 also includes one or more temperature sensors 1330 and a baseboard management controller 1332. The temperature sensors 1330 may be embodied as any type of sensor capable of producing sensor data indicative of a temperature of the sled 1300 and/or a particular electrical component of the sled 1300. For example, in some embodiments, one or more of the temperature sensors 1330 may be attached to, or incorporated in, an electrical component of the sled 1300. In some embodiments, for example, each physical resource 1320 may include a temperature sensor 1330 attached thereto or embedded therein to sense a temperature of the individual physical resource 1320.

The baseboard management controller 1332 may be embodied as any device capable of monitoring the temperatures sensors 1330 and reporting the sensor data to the cooling controller 1202. For example, the baseboard management controller 1332 may be embodied as hardware, firmware, or software. The baseboard management controller 1332 is configured to capture sensor data from the temperature sensors 1330 and to send the sensor data to the cooling controller 1202. In the illustrative embodiment, the baseboard management controller 1332 is embodied as hardware capable of communicating with the temperature sensors 1330 and the cooling controller 1202 through an out-of-band channel, i.e. a channel at least partially dedicated to communication related to the functionality of the baseboard management controller 1332. Of course, in other embodiments, the baseboard management controller 1332 may be configured to communicate with the cooling controller 1202 via virtual "in-band" channel using a virtual private network (VPN) over an established network connection. Additionally, in some embodiments, the baseboard management controller 1332 may be compatible with one or more computer interface specifications, such as an Intelligent Platform Management Interface (IPMI). It should be appreciated that, in some embodiments, the functionality of the baseboard management controller 1332, including communication, may be performed independently of the operation of the rest of the sled 1300.

The sled 1300 also includes one or more additional physical resources 1336 mounted to the top side 1350 of the chassis-less circuit board substrate 1302. In the illustrative embodiment, the additional physical resources include a network interface controller (NIC), a host fabric interface (HFI), and/or other communication circuitry. Of course, depending on the type and functionality of the sled 1300, the physical resources 1336 may include additional or other electrical components, circuits, and/or devices in other embodiments. Of course, in other embodiments, some or all of the additional physical resources 1336 may be mounted to the bottom side 1450 of the chassis-less circuit board substrate 1302.

The physical resources 1320 are communicatively coupled to the baseboard management controller 1332 and/ or the additional physical resources 1336 via an input/output (I/O) subsystem 1322. The I/O subsystem 1322 may be embodied as circuitry and/or components to facilitate input/ output operations with the physical resources 1320, the baseboard management controller 1332, the additional physical resources 1336, and/or other components of the sled 1300. For example, the I/O subsystem 1322 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 1322 is embodied as, or otherwise includes, a double data rate 4 (DDR4) data bus or a DDR5 data bus.

The sled 1300 also includes a power connector 1340 configured to mate with a corresponding power connector of the rack 1500 when the sled 1300 is mounted in therein. The sled 1300 receives power from a power supply of the rack 1500 via the power connector 1340 to supply power to the various electrical components of the sled 1300. That is, the sled 1300 does not include any local power supply (i.e., an on-board power supply) to provide power to the electrical components of the sled 1300. The exclusion of a local or on-board power supply facilitates the reduction in the overall footprint of the chassis-less circuit board substrate 1302, which may increase the thermal cooling characteristics of the various electrical components mounted on the chassis-less circuit board substrate 1302 as discussed above.

In addition to lacking a local or on-board power supply, it should be appreciated that the illustrative sled 1300 also does not include a local or on-board cooling system to cool the electrical components of the sled 1300. That is, the sled 1300 does not include on-board fans or other active cooling devices or systems. For example, while the physical resources 1320 may include heatsinks or other passive cooing devices, the heatsinks of the physical resources 1320 do not include fans attached thereto. Additionally, because the chassis-less circuit board substrate 1302 does not include a housing or enclosure, there are no fans or other active cooling systems attached to a housing as is typical in standard servers. Rather, as discussed below, sled 1300 receives cooling via the cooling system 1220 of the rack 1500 as discussed in more detail below.

Figure 15:
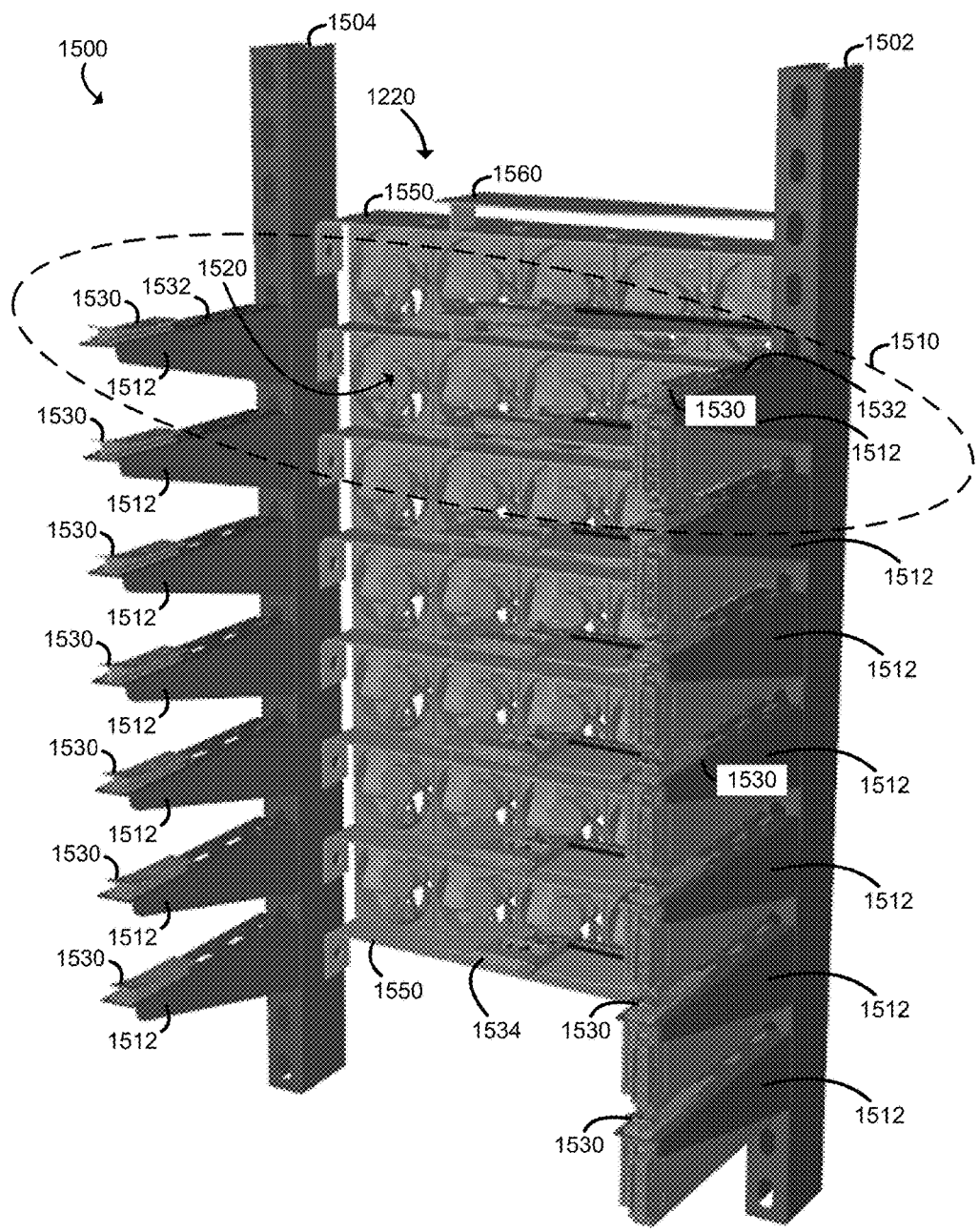
FIG. 15 is a side perspective view of at least one embodiment of a rack of the data center of FIG. 12.

Referring now to FIG. 15, in addition to the physical resources 1336 mounted on the top side 1350 of the chassis-less circuit board substrate 1302, the sled 1300 also includes one or more memory devices 1420 mounted to a bottom side 1450 of the chassis-less circuit board substrate 1302. That is, the chassis-less circuit board substrate 1302 is embodied as a double-sided circuit board. In some embodiments, the sled 1300 may also include one or more temperature sensors 1330 mounted to the bottom side 1350 of the chassis-less circuit board substrate 1302 or to electrical components mounted thereon. The physical resources 1320 are communicatively coupled to the memory devices 1420 via the I/O subsystem 1322. For example, the physical resources 1320 and the memory devices 1420 may be communicatively coupled by one or more vias extending through the chassis-less circuit board substrate 1302. Each physical resource 1320 may be communicatively coupled to a different set of one or more memory devices 1420 in some embodiments. Alternatively, in other embodiments, each physical resource 1320 may be communicatively coupled to each memory devices 1420.

The memory devices 1420 may be embodied as any type of memory device capable of storing data for the physical resources 1320 during operation of the sled 1300. For example, in the illustrative embodiments the memory devices 1420 are embodied as dual in-line memory modules (DIMMs), which may support DDR, DDR2, DDR3, DDR4, or DDR5 random access memory (RAM). Of course, in other embodiments, the memory devices 1420 may utilize other memory technologies, including volatile and/or non-volatile memory. For example, types of volatile memory may include, but are not limited to, data rate synchronous dynamic RAM (DDR SDRAM), static random-access memory (SRAM), thyristor RAM (T-RAM) or zero-capacitor RAM (Z-RAM). Types of non-volatile memory may include byte or block addressable types of non-volatile memory. The byte or block addressable types of non-volatile memory may include, but are not limited to, 3-dimensional (3-D) cross-point memory, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

It should be appreciated that the sled 1300 may have configurations and topologies different from the illustrative embodiments described herein in other embodiments. As such, it should be appreciated that the component diagrams illustrated in FIGS. 13 and 14 are merely illustrative logical representations of the sled 1300 and are not limiting. For example, although particular components of the sled 1300 have been described as being mounted on the top side 1350 or bottom side 1450 of the chassis-less circuit board substrate 1302, such components may be mounted on the other side of the chassis-less circuit board substrate 1302 in other embodiments.

Figure 16:
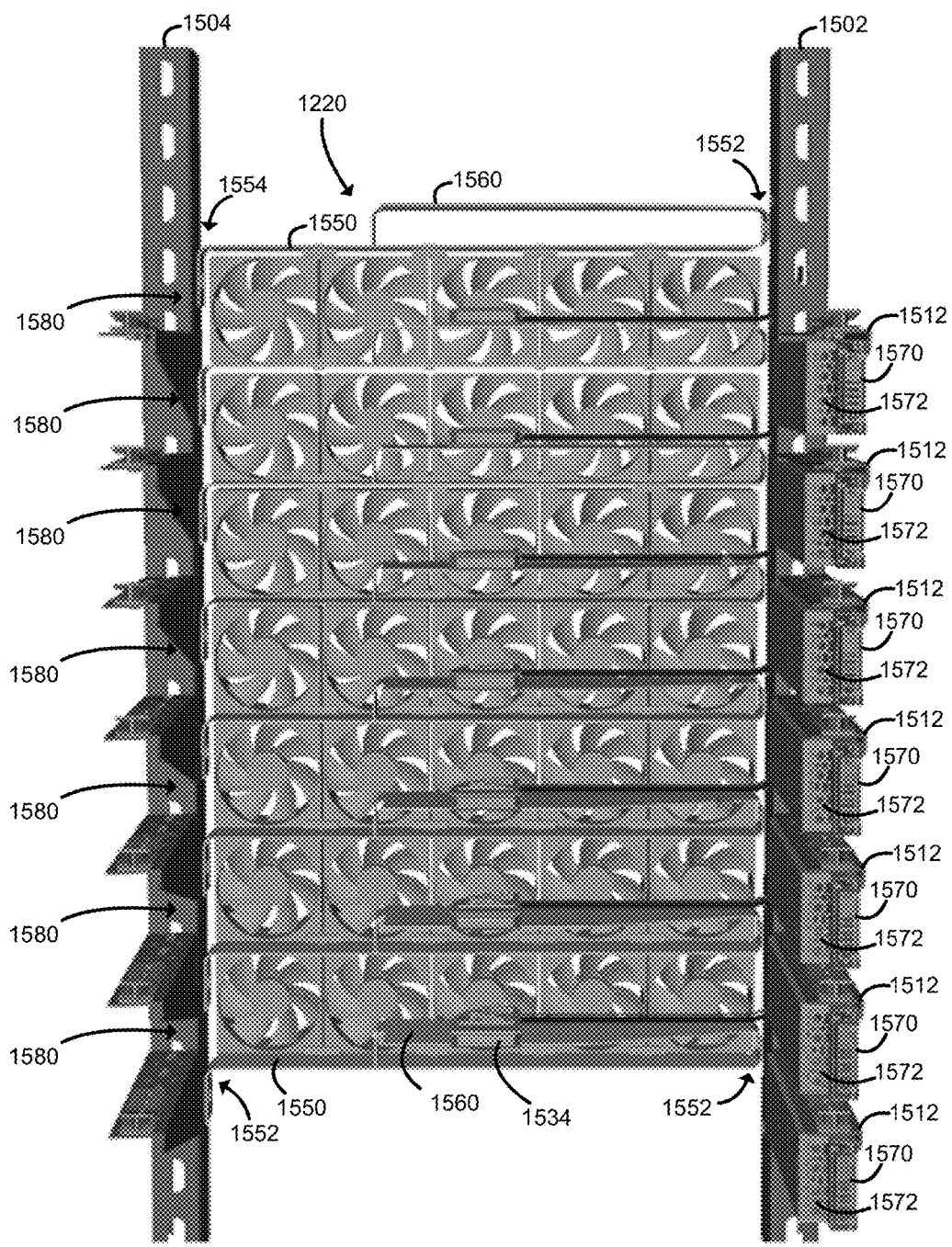
FIG. 16 is a front elevation view of the rack of FIG. 15.
Figure 17:
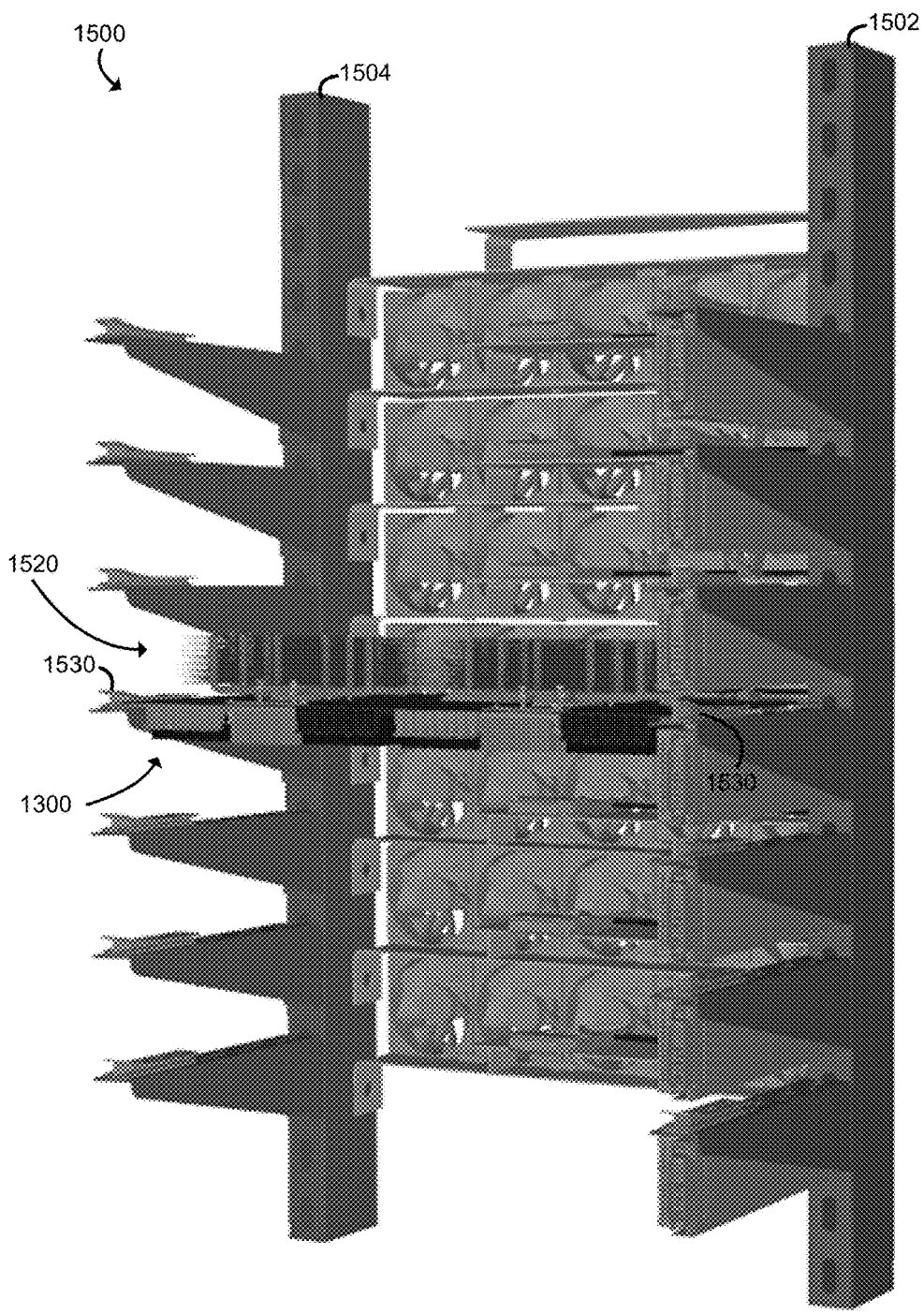
FIG. 17 is another side perspective view of the rack of FIG. 15 having a sled received in a corresponding sled slot of the rack.

Referring now to FIGS. 15-17, each of the racks 102, 202, 302, 402, 902 discussed above may be embodied as a rack 1500 in some embodiments. The illustrative rack 1500 includes two elongated support posts 1502, 1504, which are arranged vertically. For example, the elongated support posts 1502, 1504 may extend upwardly from a floor of the data center 1200 when deployed. The rack 1500 also includes one or more horizontal pairs 1510 of elongated support arms 1512 configured to support a sled 1500 as discussed below. Each pair 1510 of the elongated support arms 1512 includes an elongated support arm 1512 that extends outwardly from the elongated support post 1502 and a corresponding elongated support arm 1512 that extends outwardly from the elongated support post 1504. As an illustrative example, one illustrative pair 1510 of the elongated support arms 1512 is referenced in FIG. 15 with a dashed ellipse.

Each pair 1510 of elongated support arms 1512 defines a sled slot 1520 of the rack 1500, which is configured to receive a sled 1300. To do so, each elongated support arm 1512 includes a circuit board guide 1530 secured to, or otherwise mounted to, a top side 1532 of the corresponding elongated support arm 1512. For example, in the illustrative embodiment, each circuit board guide 1530 is mounted at a distal end of the corresponding elongated support arm 1512 relative to the corresponding elongated support post 1502, 1504. For clarity of the Figures, not every circuit board guide 1530 may be referenced in each Figure.

The illustrative rack 1500 includes seven pairs 1510 of elongated support arms 1512 that define a corresponding seven sled slots 1520, each configured to receive and support a corresponding sled 1500 as discussed above. Of course, in other embodiments, the rack 1500 may include additional or fewer pairs 1510 of elongated support arms 1512 (i.e., additional or fewer sled slots 1520). It should be appreciated that because the sled 1300 is chassis-less, the sled 1300 has an overall reduced height relative to typical servers. As such, in some embodiments, the height of each sled slot 1520 may be shorter than the height of a typical server (e.g., shorter than a single rank unit, "1U"). That is, the vertical distance between each pair 1510 of elongated support arms 1512 may be less than a standard rank unit "1U." Additionally, due to the relative decrease in height of the sled slots 1520, the overall height of the rack 1500 may be shorter than the height of traditional rack enclosures. For example, in some embodiments, each of the elongated support posts 1502, 1504 may have a length of six feet or less. Again, in other embodiments, the rack 1500 may have different dimensions. Further, it should be appreciated that the rack 1500 does not include any walls, enclosures, or the like. Rather, the rack 1500 is an enclosure-less rack that is opened to the local environment. Of course, in some cases, an end plate may be attached to one of the elongated support posts 1502, 1504 in those situations in which the rack 1500 forms an end-of-row rack in a data center 1200.

As shown in FIG. 16, the illustrative rack 1500 also includes a cross-support arm 1550 for each pair 1510 of elongated support arms 1512. Each cross-support arm 1550 includes a distal end 1552 secured to the elongated support post 1502 and an opposite distal end 1554 secured to the elongated support post 1504 such that each cross-support arm 1550 extends between the elongated support posts 1502, 1504 in a horizontal direction. Of course, the rack 1500 may include additional cross-support arms 1550 in other embodiments. For example, in the illustrative embodiment, the rack 1500 includes an additional cross-support arm 1550 located toward the top of the elongated support posts 1502, which is used to support a fan array 1580 as discussed in more detail below.

Each cross-support arm 1550 includes a support platform 1560 on which a corresponding optical data connector 1534 is mounted. Each optical data connector 1534 is associated with a corresponding sled slot 1520 and is configured to mate with an optical data connector of a sled 1300 when the sever sled 1300 is received in the corresponding sled slot 1520.

The illustrative rack 1500 also includes a power supply 1570 associated with each sled slot 1520. Each power supply 1570 is secured to one of the elongated support arms 1512 of the pair 1510 of elongated support arms 1512 that define the corresponding sled slot 1520. For example, as shown in FIG. 16, the rack 1500 may include a power supply 1570 coupled or secured to each elongated support arm 1512 extending from the elongated support post 1502. Each power supply 1570 includes a power connector 1572 configured to mate with the power connector 1340 of the sled 1300 when the sled 1300 is received in the corresponding sled slot 1520 as shown in FIG. 17. As discussed above, the sled 1300 does not include any on-board power supply and, as such, the power supplies 1570 provide power to corresponding sleds 1300 when mounted to the rack 1500.

As discussed above, the rack 1500 also includes a cooling system 1220. In the illustrative embodiment, the cooling system 1220 is embodied as a number of fan arrays 1580, each of which includes multiple fans arranged in a row. As shown in FIG. 16, each fan array 1580 is aligned in a horizontal line between the elongated support posts 1502, 1504. In the illustrative embodiment, the fan arrays 1580 are secured to the cross-support arms 1550 via clips or similar mounting mechanisms. Each fan array 1580 is associated with a different one of the sled slots 1520 of the rack 1500 and is controllable to provide cooling to a sled 1300 received in its corresponding sled slot 1520.

Figure 18:
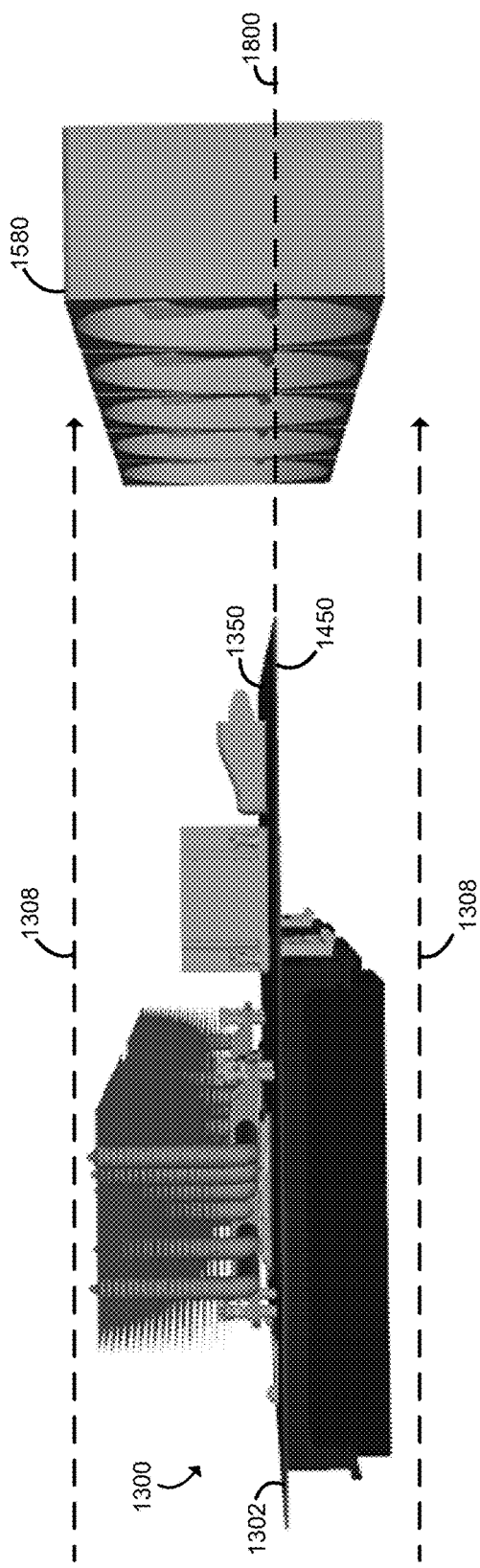
FIG. 18 is a side elevation view of a sled and an associated fan array of the rack of FIG. 15.

As shown in FIG. 18, each fan array 1580 is coupled to the corresponding cross-support arms 1550 in a position such that the fan array 1580 provides cooling to electrical components situation on both the top side 1350 and the bottom side 1450 of the chassis-less circuit board substrate 1302. For example, as shown in FIG. 18, at least a portion of each fan array 1580 is positioned above a plane 1800 defined by the chassis-less circuit board substrate 1302 of the sled 1300 when the sled 1300 is received in the sled slot 1520 associated with the particular fan array 1580. Additionally, at least a portion of each fan array 1580 lies below the plane 1800. In an illustrative embodiment, for example, about 80% of the fan array 1580 may be located above the plane 1800 and about 20% of the fan array 1580 may be located below the plane 1800. Additionally, in some embodiments, the diameter of the fans of the fan array 1580 may be larger than a typical server due to the increased vertical distance between mounted sleds 1300.

In operation, the fan array 1580 pulls air along the airflow path 1308 to cool the electrical components located on the top side 1350 and the bottom side 1460 of the chassis-less circuit board substrate 1302. As discussed in more detail below, however, the cooling provided by a particular fan array 1580 may be augmented by adjacent fan arrays 1580 as needed.

Figure 19:
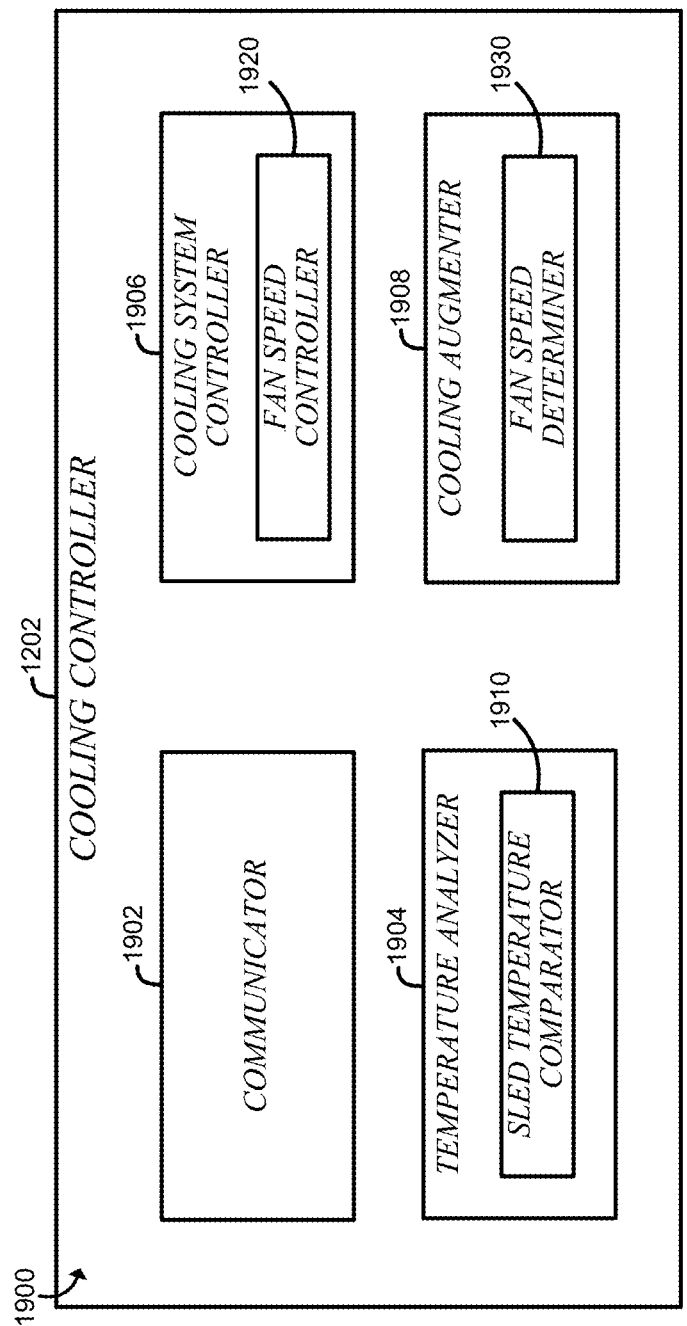
FIG. 19 is a simplified block diagram of at least one embodiment of an environment that may be established by the cooling controller of the data center of FIG. 12.
Figure 20:
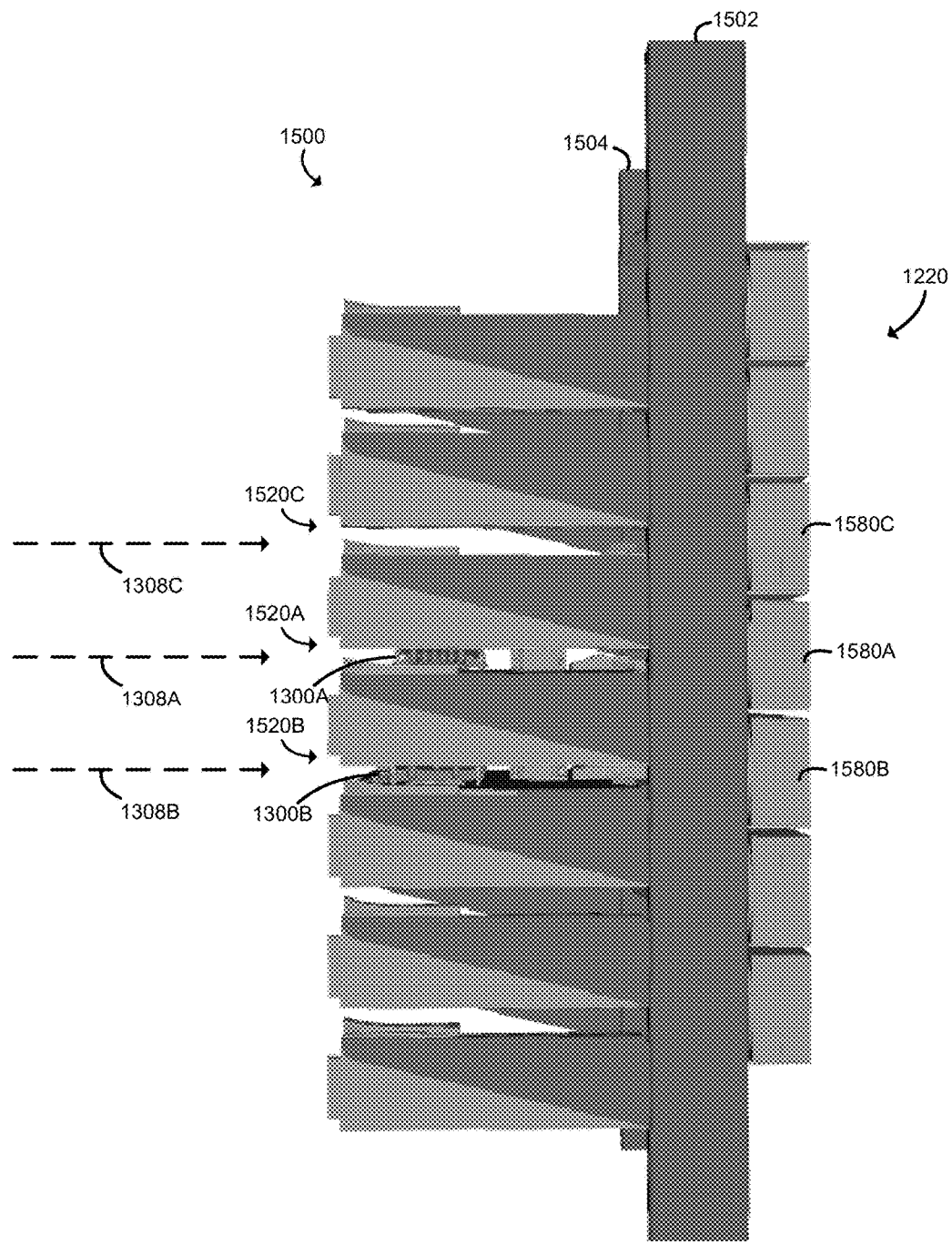
FIG. 20 is a side elevation view of the rack of FIG. 15 having a pair of sleds received in corresponding sled slots of the rack.

Referring now to FIG. 19, in use, the cooling controller 1202 may establish an environment 1900. The illustrative environment 1900 includes a communicator 1902, a temperature analyzer 1904, a cooling system controller 1906, and a cooling augmenter 1908. The various components of the environment 1900 may be embodied as hardware, firmware, software, or a combination thereof. As such, in some embodiments, one or more of the components of the environment 1900 may be embodied as circuitry or collection of electrical devices (e.g., a communicator circuit 1902, a temperature analyzer circuit 1904, a cooling system controller circuit 1906, and a cooling augmenter circuit 1908, etc.). It should be appreciated that, in such embodiments, one or more of the communicator circuit 1902, the temperature analyzer circuit 1904, the cooling system controller circuit 1906, and/or the cooling augmenter circuit 1908 may form a portion of one or more of the processor 1210, the I/O subsystem 1214, the communication circuit 1216, and/or other components of the cooling controller 1202. Additionally, in some embodiments, one or more of the illustrative components of the environment 1900 may form a portion of another component and/or one or more of the illustrative components may be independent of one another.

The communicator 1902, which may be embodied as hardware, firmware, software, virtualized hardware, emulated architecture, and/or a combination thereof as discussed above, is configured to communicate with the sleds 1300 and racks 1500. In particular, the communicator 1902 receives sensor data from the temperature sensor 1330 (e.g., from the baseboard management controller 1332) of the sled 1300 and/or from the temperature sensor 1260 of the racks 1500 and transmit control signals to the cooling systems 1220 of the racks 1500 to control operation thereof. To do so, the communicator 1902 may utilize any suitable communication protocol and/or technology.

The temperature analyzer 1904, which may also be embodied as hardware, firmware, software, virtualized hardware, emulated architecture, and/or a combination thereof as discussed above, is configured to analyze the sensor data received from the temperature sensors 1260, 1330 and determine a temperature of one or more sleds 1300 based thereon. Additionally, the temperature analyzer 1904 is configured to analyze the determined temperature to determine a cooling parameter for the corresponding sled 1300. For example, the temperature analyzer 1904 may determine a fan speed of the fan array 1580 associated with the sled slot 1520 in which the particular sled 1300 is received or mounted. To do so, the temperature analyzer 1904 may include a sled temperature comparator 1910 configured to compare the determine temperature of a sled 1300 to a reference threshold. Additionally or alternatively, in some embodiments, the sled temperature comparator 1910 may be configured to perform some amount of temperature prediction by analyze the temperature of the sled 1300 over a period of time to predict a future temperature of the sled 1300. In such embodiments, the temperature analyzer 1904 may determine the cooling parameter based on the predicted temperature of the particular sled 1300.

The cooling system controller 1906, which may also be embodied as hardware, firmware, software, virtualized hardware, emulated architecture, and/or a combination thereof as discussed above, is configured to control the operation of the cooling systems 1220 of the racks 1500 based on direction from the temperature analyzer 1904 (e.g., based on the determined cooling parameter) and/or the cooling augmenter 1908 as discussed below. To do so, the illustrative cooling system controller 1906 includes a fan speed controller 1920 configured to control a fan speed of the fans of a fan array 1580 associated with the sled slot 1520 in which the particular sled 1300 is received or mounted.

The cooling augmenter 1908, which may also be embodied as hardware, firmware, software, virtualized hardware, emulated architecture, and/or a combination thereof as discussed above, is configured to determine whether the cooling of a particular sled 1300 requires augmenting. That is, the cooling augmenter 1908 is configured to determine whether a sled 1300 is running "hot" and, if so, attempt to supplement the cooling of that sled 1300 provided by its associated fan array 1580 by controlling one or more adjacent fan arrays 1580. For example, in an embodiment in which there is no sled 1300 mounted in the adjacent sled slot 1520, the associated fan array 1580 of the adjacent sled slot 1520 may be turned off. In such an embodiment, the cooling augmenter 1908 may be configured to control turn on the fan array 1580 of the adjacent sled slot 1520 to provide additional cooling to the "hot" sled 1300. In other embodiments in which there is a sled 1300 mounted in the adjacent sled slot 1520, the cooling augmenter 1908 may configured to adjust the fan speed of the fan array 1580 of the adjacent sled slot 1520 to increase the cooling of the "hot" sled 1300. In this way, the cooling augmenter 1908 may augment the cooling of the particular sleds 1300.

Figure 21:
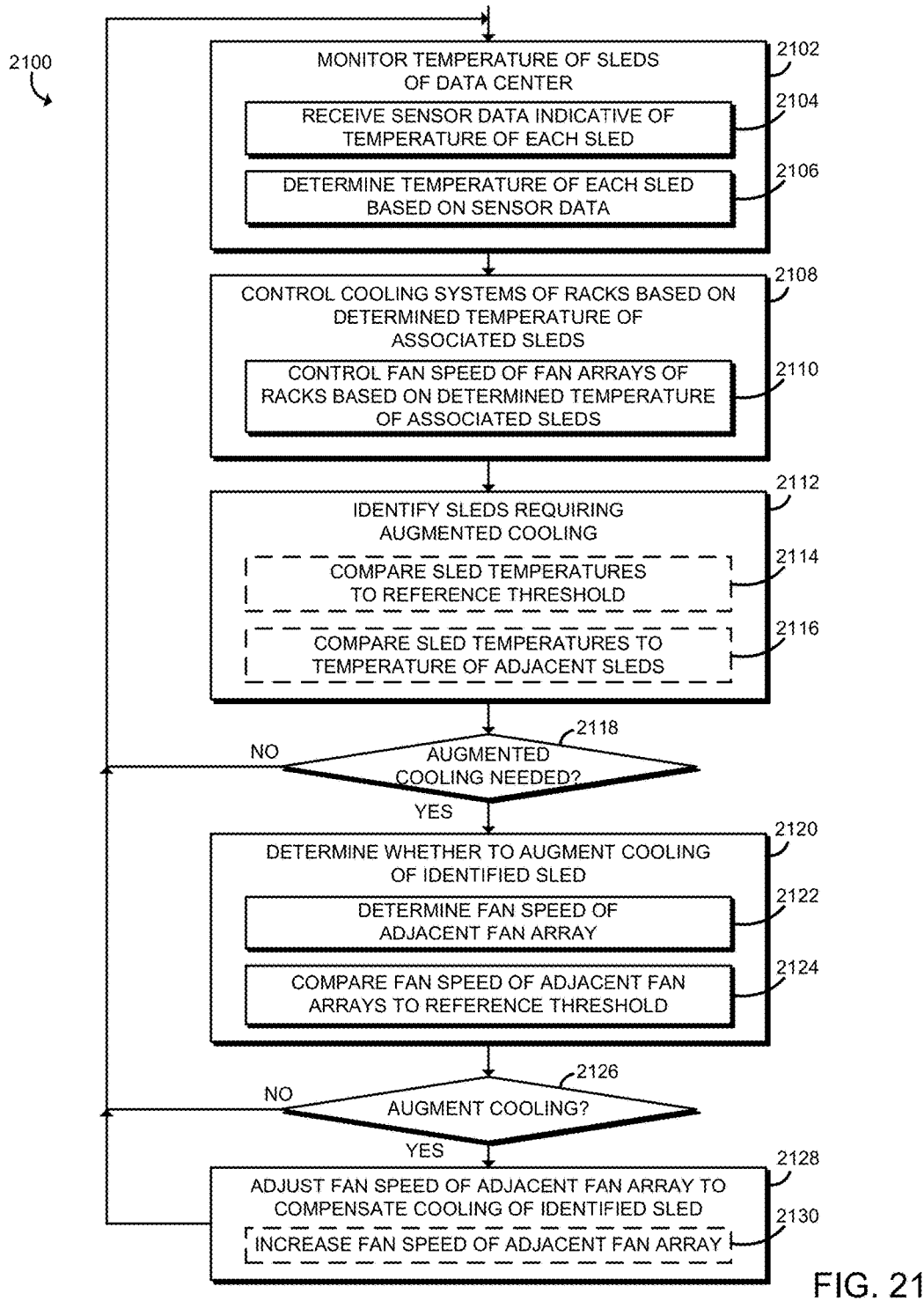
FIG. 21 is a simplified flow diagram of at least one embodiment of a method for managing the cooling of sever racks of the data center of FIG. 12 that may be executed by the cooling controller of FIGS. 12 and 19.

An example of the augmenting of the cooling of a sled 1300A is shown in FIG. 21. In the illustrative example, the sled 1300A is received in a sled slot 1520A of the rack 1500. Additionally, another sled 1300B is received in a lower adjacent sled slot 1520B and no sled 1300 is received in an upper adjacent sled slot 1520C. During normal operation, the fan array 1580A associated with the sled slot 1520A provides sufficient cooling to the sled 1300A. However, if the cooling augmenter 1908 determines that the cooling of the sled 1300A provided by the fan array 1580A requires augmenting, the cooling augmenter 1908 may increase the fan speed of adjacent fan arrays 1580B and 1580C. For example, the cooling augmenter 1908 may increase the fan speed of the fan array 1580B and/or turn on the fan array 1580C (which may be presently turned off because there is no sled 1300 mounted in the sled slot 1520C). It should be appreciated that because the rack 1500 and the sleds 1300 are opened-aired (i.e., neither the rack 1500 nor the sleds 1300 include enclosures that block air flow), the airflow 1308B provided by the operation of the fan array 1580B and the air flow 1308C provided by the operation of fan array 1580C may supplement the air flow 1308A provided by the fan array 1580A in cooling the sled 1300A.

Referring back to FIG. 19, it should be appreciated that, in some cases, the cooling augmenter 1908 may be unable to augment cooling of a fan array 1508 due to the present operation of the adjacent fan arrays 1508. As such, in some embodiments, the cooling augmenter 1908 may be configured to determine whether the cooling provided by a particular fan array 1508 can be augmented. To do so, the cooling augmenter 1908 may include a fan speed determiner 1930. The fan speed determiner 1930 is configured to determine a present fan speed of any adjacent fan arrays 1508 and compare the present fan speed to a reference threshold to determine whether the fan speed of the adjacent fan array 1508 can be increased. That is, in some cases, the cooling provided by a particular fan array 1508 may not be augmented because the adjacent fan arrays 1508 are already being operated at a maximum fan speed. Of course, it should be appreciate that the efficiency of cooling of the sleds 1300 may be increased by interleaving or distributing sleds 1300 in a particular rack 1500 that tend to run "hot" and sleds 1300 that tend to run "cool."

Referring now to FIG. 21, in use, the cooling controller 1202 may execute a method 2100 for managing the cooling of sever sleds 1300 mounted in racks 1500 of the data center 1200. The method 2100 begins with block 2102 in which the cooling controller 1202 monitors the temperature of the sleds 1300. To do so, the cooling controller 1202 may receive sensor data indicative of a temperature of each monitored sled 1300 in block 2104. As discussed above, the cooling controller 1202 may receive such sensor data from the temperature sensor 1330 (e.g., from the baseboard management controller 1332) of the sled 1300 and/or from the temperature sensor 1260 of the racks 1500. In block 2106, the cooling controller 1202 may determine the temperature of each monitored sled 1300 based on the received sensor data.

Subsequently, in block 2108, the cooling controller 1202 controls the cooling system 1220 of each rack 1500 based on the determined temperatures of the sleds 1300 mounted in the corresponding racks 1500. To do so, in block 2110, the cooling controller 1202 controls the fan speed of each fan array 1580 of each rack 1500 to control the temperature of the monitored sleds 1300 as discussed above.

In block 2112, the cooling controller 1202 analyzes the determined temperature of each monitored sled 1300 to determine whether the cooling of any of the monitored sleds 1300 requires augmenting. That is, the cooling controller 1202 determines whether any sled 1300 is running "hot." To do so, the cooling controller 1202 may compare the temperature of each monitored sever sled 1300 to a reference threshold in block 2114. Additionally or alternatively, the cooling controller 1202 may compare the temperature of a each sled 1300 to the temperature of adjacent sleds 1300 (i.e., sleds 1300 mounted in adjacent sled slots 1520) in block 2116. The cooling controller 1202 may determine that the cooling of a particular sled 1300 should be augmented if, for example, the temperature of the particular sled 1300 is above the reference threshold and/or is above the temperature of adjacent sleds 1300 by a reference amount.

In block 2118, the cooling controller 1202 determines whether any sled 1300 requires augmented cooling based on the analysis performed in block 2112. If not, the method 2100 loops back to block 2102 in which the cooling controller 1202 continues to monitor the temperatures of the sleds 1300. If, however, the cooling controller 1202 determines that the cooling of a particular sled 1300 should be augmented, the method 2100 advances to block 2120. In block 2120, the cooling controller 1202 determines whether the cooling of the particular sled 1300 (i.e., the sled 1300 determined to be running "hot") can be augmented. To do so, in block 2122, the cooling controller 1202 determines the fan speed of one or more adjacent fan arrays 1580 (i.e., a fan array 1580 of a sled slot 1520 adjacent to the sled slot 1520 in which the identified sever sled 1300 is received). The cooling controller 1202 compares the determined fan speed of the adjacent fan array 1580 to a reference threshold in block 2124 to determine whether the cooling of the identified sled 1300 can be augmented. That is, the cooling controller 1202 determines whether the fan speed of the adjacent fan arrays 1580 can be increased.

In block 2126, the cooling controller determines whether to augment the cooling of the identified sled 1300 based on the determination performed in block 2120. If not, the method 2100 loops back to block 2102 in which the cooling controller 1202 continues to monitor the temperatures of the sleds 1300. If, however, the cooling controller 1202 determines to augment the cooling of the identified serve sled 1300, the method 2100 advances to block 2128. In block 2128, the cooling controller 1202 adjusts the fan speed of the adjacent fan array(s) 1580. Specifically, the cooling controller 1202 may increase the fan speed of the adjacent fan array(s) 1580 in block 2130. After the fan speed of the adjacent fan arrays 1580 has been adjusted, the method 2100 loops back to block 2102 in which the cooling controller 1202 continues to monitor the temperatures of the sleds 1300.

EXAMPLES

Illustrative examples of the technologies disclosed herein are provided below. An embodiment of the technologies may include any one or more, and any combination of, the examples described below.

Example 1 includes a cooling controller of a data center, the cooling controller comprising one or more processors; one or more memory devices having stored therein a plurality of instructions that, when executed by the one or more processors, cause the cooling controller to monitor sensor data indicative of a temperature of a first sled mounted in a first sled slot of a rack; and control a cooling system of the rack based on the temperature of the sled to control the temperature of the sled.

Example 2 includes the subject matter of Example 1, and wherein to monitor the sensor data indicative of the temperature of the first sled comprises to receive sensor data indicative of the temperature of the first sled from a temperature sensor of the first sled.

Example 3 includes the subject matter of any of Examples 1 and 2, and wherein to monitor the sensor data indicative of the temperature of the first sled comprises to receive sensor data indicative of the temperature of the first sled from a temperature sensor of the rack.

Example 4 includes the subject matter of any of Examples 1-3, and wherein to control the cooling system of the rack comprises to control a fan speed of a fan array of the first sled slot of the rack to cool the sled.

Example 5 includes the subject matter of any of Examples 1-4, and wherein the plurality of instructions, when executed by the one or more processors, further cause the cooling controller to determine whether the cooling of the first sled provided by the fan array of the first sled slot requires augmenting based on the temperature of the first sled.

Example 6 includes the subject matter of any of Examples 1-5, and wherein to determine whether the cooling of the first sled requires augmenting comprises to compare the temperature of the first sled to a reference threshold temperature.

Example 7 includes the subject matter of any of Examples 1-6, and wherein to determine whether the cooling of the first sled requires augmenting comprises to compare the temperature of the first sled to a temperature of a second sled mounted in a second sled slot of the rack adjacent to the first sled slot.

Example 8 includes the subject matter of any of Examples 1-7, and wherein the plurality of instructions, when executed by the one or more processors, further cause the cooling controller to adjust a fan speed of one or more fan arrays of a second sled slot adjacent to the first sled slot in response to a determination that the cooling of the first sled requires augmenting.

Example 9 includes the subject matter of any of Examples 1-8, and wherein the plurality of instructions, when executed by the one or more processors, further cause the cooling controller to determine, in response to a determination that the cooling of the first sled requires augmenting, whether to augment the cooling of the first sled based on a fan speed of a fan array of a second sled slot adjacent to the first sled slot.

Example 10 includes the subject matter of any of Examples 1-9, and wherein the plurality of instructions, when executed by the one or more processors, further cause the cooling controller to adjust the fan speed of the fan array of the second sled slot augment the cooling of the first sled slot in response to a determination to augment the cooling of the first sled.

Example 11 includes the subject matter of any of Examples 1-10, and wherein to adjust the fan speed of the fan array of the second sled slot comprises to increase the fan speed.

Example 12 includes a method for managing the cooling of sever racks of a data center, the method comprising monitoring, by a cooling controller of the data center, sensor data indicative of a temperature of a first sled mounted in a first sled slot of a rack, wherein the sled includes a chassis-less circuit board substrate; and controlling a cooling system of the rack based on the temperature of the sled to control the temperature of the sled.

Example 13 includes the subject matter of Example 12, and wherein monitoring the sensor data indicative of the temperature of the first sled comprises receiving sensor data indicative of the temperature of the first sled from a temperature sensor of the first sled.

Example 14 includes the subject matter of any of Examples 12 and 13, and wherein monitoring the sensor data indicative of the temperature of the first sled comprises receiving sensor data indicative of the temperature of the first sled from a temperature sensor of the rack.

Example 15 includes the subject matter of any of Examples 12-14, and wherein controlling the cooling system of the rack comprises controlling a fan speed of a fan array of the first sled slot of the rack to cool the sled.

Example 16 includes the subject matter of any of Examples 12-15, and further including determining whether the cooling of the first sled provided by the fan array of the first sled slot requires augmenting based on the temperature of the first sled.

Example 17 includes the subject matter of any of Examples 12-16, and wherein determining whether the cooling of the first sled requires augmenting comprises comparing the temperature of the first sled to a reference threshold temperature.

Example 18 includes the subject matter of any of Examples 12-17, and wherein determining whether the cooling of the first sled requires augmenting comprises comparing the temperature of the first sled to a temperature of a second sled mounted in a second sled slot of the rack adjacent to the first sled slot.

Example 19 includes the subject matter of any of Examples 12-18, and further including adjusting a fan speed of a fan array of a second sled slot adjacent to the first sled slot in response to a determination that the cooling of the first sled requires augmenting.

Example 20 includes the subject matter of any of Examples 12-19, and further including determining, in response to a determination that the cooling of the first sled requires augmenting, whether to augment the cooling of the first sled based on a fan speed of a fan array of a second sled slot adjacent to the first sled slot.

Example 21 includes the subject matter of any of Examples 12-20, and further including adjusting the fan speed of the fan array of the second sled slot augment the cooling of the first sled slot in response to a determination to augment the cooling of the first sled.

Example 22 includes the subject matter of any of Examples 12-21, and wherein adjusting the fan speed of the fan array of the second sled slot comprises increasing the fan speed.

Example 23 includes one or more machine-readable storage media comprising a plurality of instructions stored thereon that, in response to being executed, cause a cooling controller of a data center to perform the method of any of Examples 12-22.

Example 24 includes a cooling controller comprising a communication circuit to receive sensor data indicative of a temperature of a first sled mounted in a first sled slot of a rack, wherein the sled includes a chassis-less circuit board substrate; and means for controlling a cooling system of the rack based on the temperature of the sled to control the temperature of the sled.

Example 25 includes the subject matter of Example 24, and wherein communication circuit is to receive the sensor data from a temperature sensor of the first sled.

Example 26 includes the subject matter of any of Examples 24 and 25, and wherein communication circuit is to receive the sensor data from a temperature sensor of the rack.

Example 27 includes the subject matter of any of Examples 24-26, and wherein the means for controlling the cooling system of the rack comprises means for controlling a fan speed of a fan array of the first sled slot of the rack to cool the sled.

Example 28 includes the subject matter of any of Examples 24-27, and further including means for determining whether the cooling of the first sled provided by the fan array of the first sled slot requires augmenting based on the temperature of the first sled.

Example 29 includes the subject matter of any of Examples 24-28, and wherein the means for determining whether the cooling of the first sled requires augmenting comprises means for comparing the temperature of the first sled to a reference threshold temperature.

Example 30 includes the subject matter of any of Examples 24-29, and wherein the means for determining whether the cooling of the first sled requires augmenting comprises means for comparing the temperature of the first sled to a temperature of a second sled mounted in a second sled slot of the rack adjacent to the first sled slot.

Example 31 includes the subject matter of any of Examples 24-30, and further including means for adjusting a fan speed of a fan array of a second sled slot adjacent to the first sled slot in response to a determination that the cooling of the first sled requires augmenting.

Example 32 includes the subject matter of any of Examples 24-31, and further including means for determining, in response to a determination that the cooling of the first sled requires augmenting, whether to augment the cooling of the first sled based on a fan speed of a fan array of a second sled slot adjacent to the first sled slot.

Example 33 includes the subject matter of any of Examples 24-32, and further including means for adjusting the fan speed of the fan array of the second sled slot augment the cooling of the first sled slot in response to a determination to augment the cooling of the first sled.

Example 34 includes the subject matter of any of Examples 24-33, and wherein the means for adjusting the fan speed of the fan array of the second sled slot comprises means for increasing the fan speed.

Example 35 includes a rack to support a plurality of sleds, the rack comprising two elongated support posts that extend vertically; a plurality of pairs of elongated support arms, wherein each pair of elongated support arms comprises a first support arm that extends outwardly from a first support post of the two elongated support posts and a second support arm that extends outwardly from a second support post of the two elongated supports posts, wherein each pair of elongated support arms defines a sled slot to receive a corresponding sled; and a cooling system comprises a plurality of fan arrays, wherein each fan array includes a plurality of fans and is associated with a different sled slot, wherein each fan array is controllable to provide cooling to a sever sled received in the corresponding sled slot.

Example 36 includes the subject matter of Example 35, and wherein each fan of each fan array is positioned such that at least a first portion of each fan is positioned above a plane defined by a chassis-less circuit board substrate of a corresponding sled when the corresponding sled is received in the sled slot with which the corresponding fan array is associated and a second portion of each fan is positioned below the plane.

Example 37 includes the subject matter of any of Examples 35 and 36, and wherein about 80% of each fan is positioned above the plane and about 20% of each fan is positioned below the plane.

Example 38 includes the subject matter of any of Examples 35-37, and further including a plurality of cross-support arms, wherein each cross-support arm is associated with a different sled slot and includes a first end coupled to the first support post, a second end coupled to the second support post, and a support platform, and wherein each fan array is coupled to at least one of the plurality of cross-support arms.

Example 39 includes the subject matter of any of Examples 35-38, and wherein each elongated support arm includes a circuit board guide attached to a top side of the corresponding elongated support arm, wherein each circuit board guide includes a circuit board slot to receive a side edge of a chassis-less circuit board substrate of a corresponding sled when the corresponding sled is received in a corresponding sled slot, and wherein each fan of each fan array is positioned such that at least a first portion of each fan is positioned above a plane defined by the chassis-less circuit board substrate of the corresponding sled when the corresponding sled is received in the corresponding sled slot with which the corresponding fan array is associated and a second portion of each fan is positioned below the plane.

Example 40 includes the subject matter of any of Examples 35-39, and wherein about 80% of each fan is positioned above the plane and about 20% of each fan is positioned below the plane.

The invention claimed is:

1. A cooling controller of a data center, the cooling controller comprising:
   one or more processors;
   one or more memory devices having stored therein a plurality of instructions that, when executed by the one or more processors, cause the cooling controller to:
   monitor sensor data indicative of a temperature of a first sled mounted in a first sled slot of a rack, wherein the first sled comprises a chassis-less circuit board substrate that is not enclosed within a sled chassis dedicated to house the first sled;
   control a cooling system of the rack based on the temperature of the first sled to control the temperature of the first sled;
   compare the temperature of the first sled to a temperature of a second sled mounted in a second sled slot of the rack adjacent to the first sled slot;
   determine whether the cooling of the first sled provided by a fan array of the first sled slot requires augmenting in response to a determination that the temperature of the first sled is greater than the temperature of the second sled by a reference amount;
   determine, in response to a determination that the cooling of the first sled requires augmenting, a present fan speed of one or more fan arrays of the second sled slot;
   compare the present fan speed of the one or more fan arrays of the second sled slot to a reference fan speed threshold; and
   adjust the fan speed of the one or more fan arrays of the second sled slot to augment the cooling of the first sled slot in response to a determination that the present fan speed of the one or more fan arrays of the second sled slot is less than the reference fan speed threshold.

2. The cooling controller of claim 1, wherein to control the cooling system of the rack comprises to control a fan speed of the fan array of the first sled slot of the rack to cool the sled.

3. The cooling controller of claim 1, wherein to determine whether the cooling of the first sled requires augmenting comprises to compare the temperature of the first sled to a reference threshold temperature.

4. A method for managing the cooling of racks of a data center, the method comprising:
   monitoring, by a cooling controller of the data center, sensor data indicative of a temperature of a first sled mounted in a first sled slot of a rack, wherein the first sled comprises a chassis-less circuit board substrate that is not enclosed within a sled chassis dedicated to house the first sled;

controlling a cooling system of the rack based on the temperature of the first sled to control the temperature of the first sled;

comparing the temperature of the first sled to a temperature of a second sled mounted in a second sled slot of the rack adjacent to the first sled slot;

determining whether the cooling of the first sled provided by a fan array of the first sled slot requires augmenting in response to a determination that the temperature of the first sled is greater than the temperature of the second sled by a reference amount;

determining, in response to a determination that the cooling of the first sled requires augmenting, a present fan speed of one or more fan arrays of the second sled slot;

comparing the present fan speed of the one or more fan arrays of the second sled slot to a reference fan speed threshold; and adjusting the fan speed of the one or more fan arrays of the second sled slot to augment the cooling of the first sled slot in response to a determination that the present fan speed of the one or more fan arrays of the second sled slot is less than the reference fan speed threshold.

5. The method of claim 4, wherein controlling the cooling system of the rack comprises controlling a fan speed of the fan array of the first sled slot of the rack to cool the sled.

6. One or more non-transitory, machine-readable storage media comprising a plurality of instructions stored thereon that, when executed, cause a cooling controller to:

monitor sensor data indicative of a temperature of a first sled mounted in a first sled slot of a rack, wherein the first sled comprises a chassis-less circuit board substrate that is not enclosed within a sled chassis dedicated to house the first sled;

control a cooling system of the rack based on the temperature of the first sled to control the temperature of the first sled;

compare the temperature of the first sled to a temperature of a second sled mounted in a second sled slot of the rack adjacent to the first sled slot;

determine whether the cooling of the first sled provided by a fan array of the first sled slot requires augmenting in response to a determination that the temperature of the first sled is greater than the temperature of the second sled by a reference amount;

determine, in response to a determination that the cooling of the first sled requires augmenting, a present fan speed of one or more fan arrays of the second sled slot;

compare the present fan speed of the one or more fan arrays of the second sled slot to a reference fan speed threshold; and adjust the fan speed of the one or more fan arrays of the second sled slot to augment the cooling of the first sled slot in response to a determination that the present fan speed of the one or more fan arrays of the second sled slot is less than the reference fan speed threshold.

7. The one or more non-transitory, machine-readable storage media of claim 6, wherein to control the cooling system of the rack comprises to control a fan speed of the fan array of the first sled slot of the rack to cool the sled.

8. The one or more non-transitory, machine-readable storage media of claim 6, wherein to determine whether the cooling of the first sled requires augmenting comprises to compare the temperature of the first sled to a reference threshold temperature.

9. An apparatus comprising:

two elongated support posts that extend vertically;

a plurality of pairs of elongated support arms, wherein each pair of elongated support arms comprises a first support arm that extends outwardly from a first support post of the two elongated support posts and a second support arm that extends outwardly from a second support post of the two elongated supports posts, wherein each pair of elongated support arms defines a sled slot to receive a corresponding sled;

a cooling system comprises a plurality of fan arrays, wherein each fan array includes a plurality of fans and is associated with a different sled slot, wherein each fan array is controllable to provide cooling to a sled received in the corresponding sled slot;

and a cooling controller comprising:

a communication circuit to receive sensor data indicative of a temperature of a first sled mounted in a first sled slot, wherein the first sled comprises a chassis-less circuit board substrate that is not enclosed within a sled chassis dedicated to house the first sled;

means for controlling the cooling system based on the temperature of the first sled to control the temperature of the first sled;

means for comparing the temperature of the first sled to a temperature of a second sled mounted in a second sled slot adjacent to the first sled slot;

means for determining whether the cooling of the first sled provided by a fan array associated with the first sled slot requires augmenting in response to a determination that the temperature of the first sled is greater than the temperature of the second sled by a reference amount;

means for determining, in response to a determination that the cooling of the first sled requires augmenting, a present fan speed of one or more fan arrays associated with the second sled slot;

means for comparing the present fan speed of the one or more fan arrays associated with the second sled slot to a reference fan speed threshold; and means for adjusting the fan speed of the one or more fan arrays associated with the second sled slot to augment the cooling of the first sled slot in response to a determination that the present fan speed of the one or more fan arrays associated with the second sled slot is less than the reference fan speed threshold.

10. The cooling controller of claim 9, wherein the means for controlling the cooling system comprises means for controlling a fan speed of the fan array associated with the first sled slot.

* * * * *